(12) United States Patent
Bansal et al.

(10) Patent No.: US 12,665,926 B2
(45) Date of Patent: *Jun. 23, 2026

(54) SYSTEM AND METHODS OF DEFENSE AGAINST DDOS ATTACKS FOR APPLICATIONS ON A MULTI-SUBSTRATE MULTI-INGRESS SHARED INFRASTRUCTURE WITH MULTIPLE CLOUD ARCHITECTURES

(71) Applicant: Salesforce, Inc., San Francisco, CA (US)

(72) Inventors: Kaushal Bansal, Alamo, CA (US); Prabhat Singh, San Jose, CA (US); Anil Abraham, Bengaluru (IN)

(73) Assignee: Salesforce, Inc., San Francisco, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/896,115

(22) Filed: Sep. 25, 2024

(65) Prior Publication Data

US 2026/0006069 A1    Jan. 1, 2026

Related U.S. Application Data

(63) Continuation-in-part of application No. 18/759,047, filed on Jun. 28, 2024.

(51) Int. Cl.
H04L 9/40 (2022.01)
(52) U.S. Cl.
CPC ................................. H04L 63/1458 (2013.01)
(58) Field of Classification Search
CPC .................................................. H04L 63/1458
See application file for complete search history.

(56) References Cited

U.S. PATENT DOCUMENTS 6,789,203 B1    9/2004  Belissent
7,516,475 B1    4/2009  Chen
(Continued)

FOREIGN PATENT DOCUMENTS

WO       2022060609 A1     3/2022

OTHER PUBLICATIONS

U.S. Appl. No. 18/161,632, Non Final Office Action mailed Mar. 13, 2025, 22 pgs.
(Continued)

*Primary Examiner* — Noura Zoubair
*Assistant Examiner* — Afaq Ali
(74) *Attorney, Agent, or Firm* — Polygon IP, LLP

(57)                ABSTRACT

A computing services environment may provide computing services to a plurality of recipients via the Internet. The computing services environment may include application gateways receiving application-layer request messages from various sources. The computing services environment may also include an orchestration engine determining mitigation policies corresponding with the application gateways based on a classification of a subset of the application-layer request messages as being sent from sources associated with a distributed denial of service attack. The computing services environment may also include application-layer web application firewalls corresponding to the application gateways and transitioning from a deactivated state to an activated state upon receipt of an instruction from the orchestration engine. The activated application-layer web application firewalls may implement the mitigation policies prevent a subset of subsequent application-layer request messages from the subset of the sources from reaching one or more components of the computing services environment.

20 Claims, 16 Drawing Sheets

(56) References Cited

U.S. PATENT DOCUMENTS

| | | | |
|---|---|---|---|
| 10,666,680 B2 * | 5/2020 | Rodniansky | H04L 67/14 |
| 10,810,233 B2 | 10/2020 | Bansal | |
| 11,552,802 B2 | 1/2023 | Bansal et al. | |
| 11,790,278 B2 | 10/2023 | Karanth | |
| 11,799,901 B2 | 10/2023 | Bansal et al. | |
| 11,805,021 B1 | 10/2023 | Bansal et al. | |
| 11,893,024 B2 | 2/2024 | Bansal et al. | |
| 11,977,476 B2 | 5/2024 | Bansal et al. | |
| 11,977,761 B2 | 5/2024 | Bansal et al. | |
| 12,069,092 B2 * | 8/2024 | Compton | H04L 63/1491 |
| 12,124,453 B2 | 10/2024 | Bansal | |
| 12,170,688 B1 * | 12/2024 | Horelu | H04L 63/1416 |
| 2004/0064727 A1 | 4/2004 | Yadav | |
| 2011/0099622 A1 | 4/2011 | Lee | |
| 2012/0151593 A1 | 6/2012 | Kang | |
| 2018/0255094 A1 * | 9/2018 | Doron | H04L 63/1416 |
| 2019/0188313 A1 | 6/2019 | Bansal et al. | |
| 2019/0199746 A1 * | 6/2019 | Doron | G06N 20/00 |
| 2020/0177549 A1 * | 6/2020 | Barton | H04L 63/1441 |
| 2020/0259792 A1 * | 8/2020 | Devarajan | H04L 63/1416 |
| 2021/0216629 A1 | 7/2021 | Miller | |
| 2021/0241047 A1 | 8/2021 | Karanth et al. | |
| 2021/0263663 A1 | 8/2021 | Bansal | |
| 2022/0060445 A1 | 2/2022 | Kovenat | |
| 2022/0086189 A1 | 3/2022 | Nguyen et al. | |
| 2022/0086193 A1 | 3/2022 | Nguyen et al. | |
| 2022/0103559 A1 | 3/2022 | Weisshaar | |
| 2022/0294818 A1 * | 9/2022 | Parekh | G06F 21/602 |
| 2023/0039162 A1 | 2/2023 | Salter et al. | |
| 2023/0244594 A1 | 8/2023 | Bansal | |
| 2023/0259831 A1 | 8/2023 | Karanth et al. | |
| 2024/0121271 A1 | 4/2024 | Bansal et al. | |
| 2024/0195908 A1 | 6/2024 | Bansal et al. | |
| 2024/0259186 A1 | 8/2024 | Bansal et al. | |
| 2024/0259396 A1 | 8/2024 | Kerkar et al. | |
| 2024/0259415 A1 | 8/2024 | Bansal et al. | |
| 2024/0259429 A1 | 8/2024 | Monni et al. | |
| 2024/0259430 A1 | 8/2024 | P J et al. | |
| 2024/0259435 A1 | 8/2024 | Giralte et al. | |
| 2024/0289259 A1 | 8/2024 | Bansal et al. | |
| 2024/0314175 A1 | 9/2024 | Bansal | |
| 2025/0260707 A1 | 8/2025 | Belgi | |

OTHER PUBLICATIONS

Office Action (Notice of Allowance and Fees Due (PTOL-85)) dated Aug. 11, 2025 for U.S. Appl. No. 18/161,632 (pp. 1-10).

Office Action dated Oct. 21, 2025 for U.S. Appl. No. 18/759,047 (pp. 1-31).

* cited by examiner

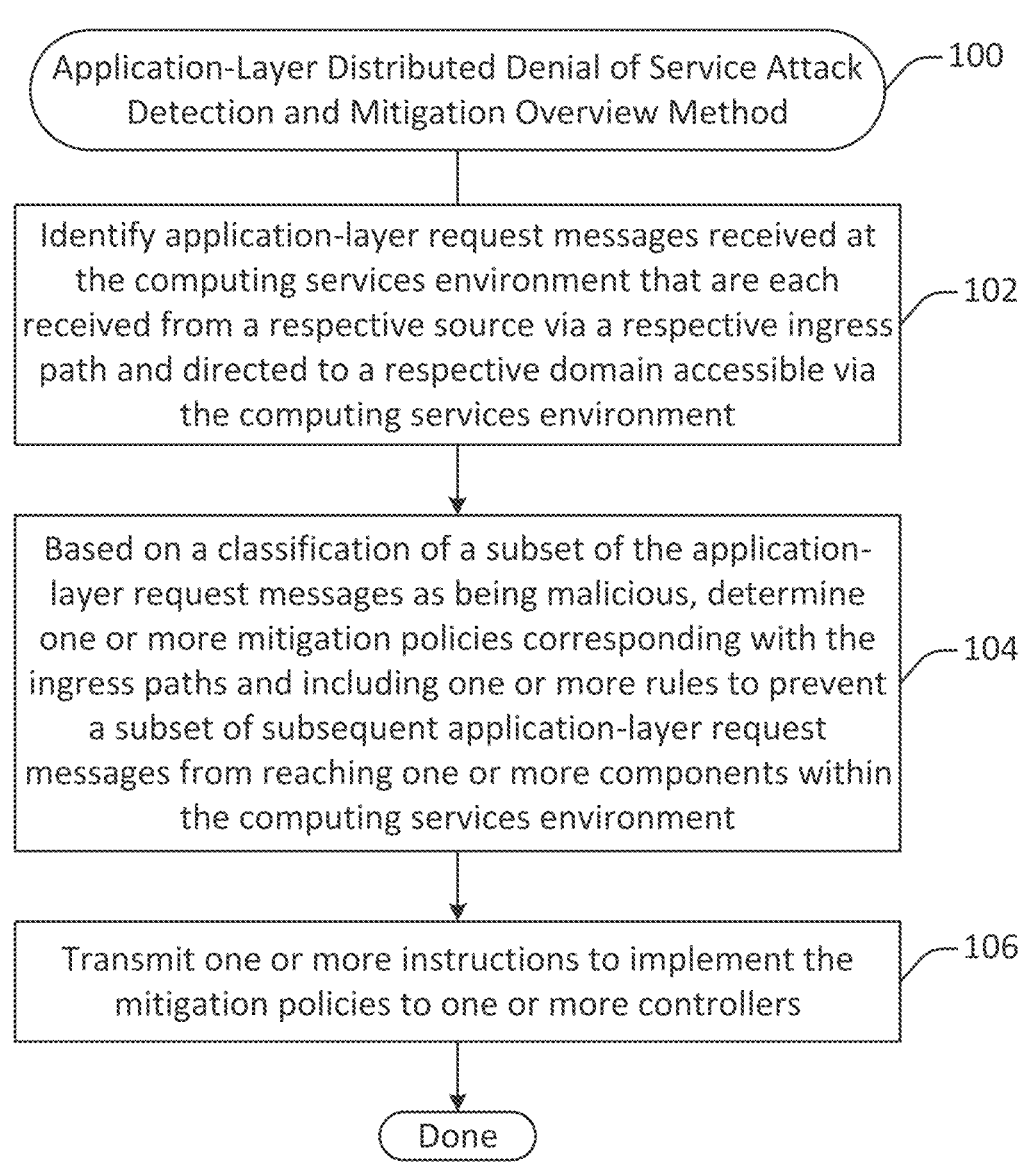

Application-Layer Distributed Denial of Service Attack Detection and Mitigation Overview Method — 100

Identify application-layer request messages received at the computing services environment that are each received from a respective source via a respective ingress path and directed to a respective domain accessible via the computing services environment — 102

Based on a classification of a subset of the application-layer request messages as being malicious, determine one or more mitigation policies corresponding with the ingress paths and including one or more rules to prevent a subset of subsequent application-layer request messages from reaching one or more components within the computing services environment — 104

Transmit one or more instructions to implement the mitigation policies to one or more controllers — 106

Done

Figure 1

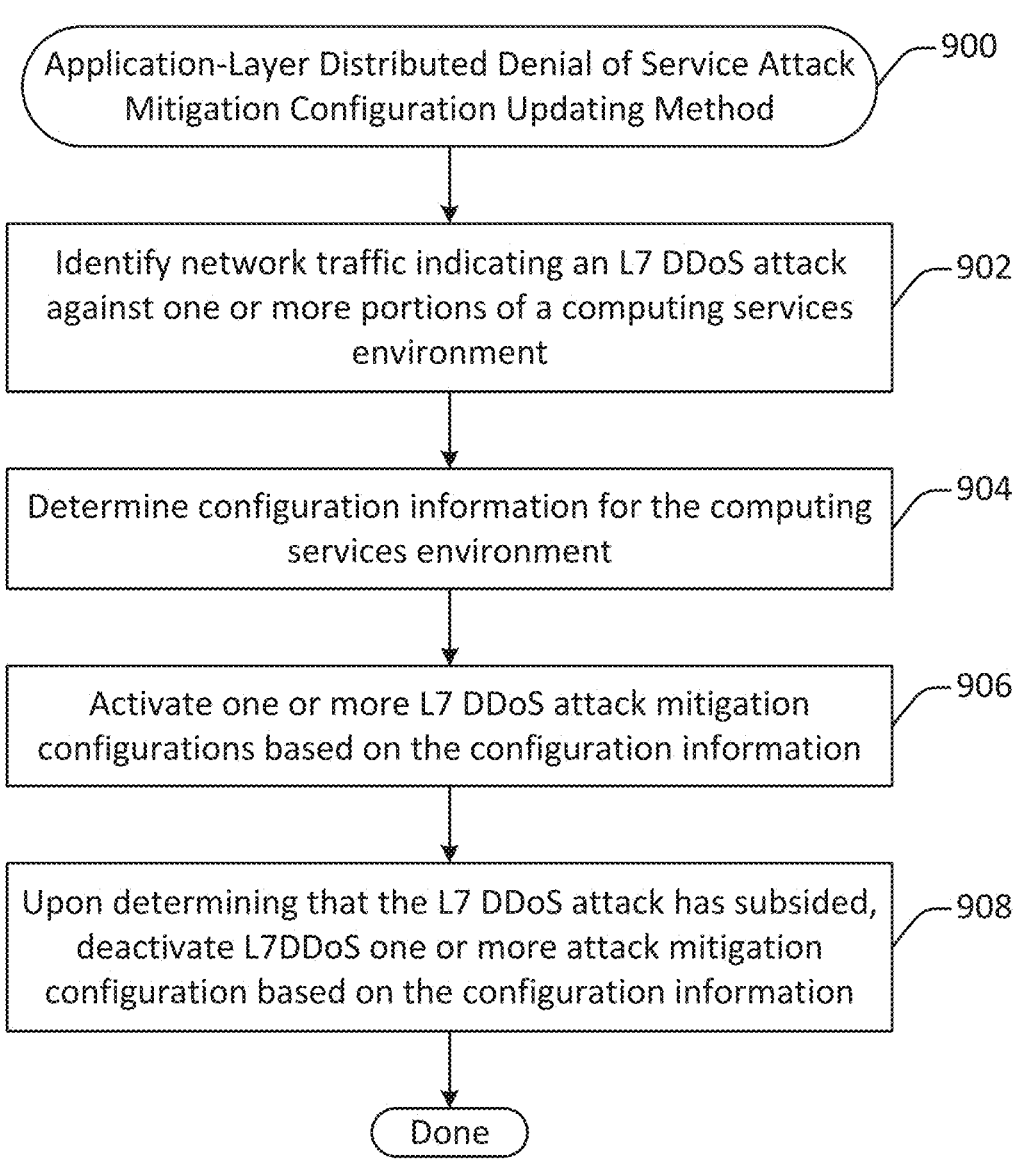

Application-Layer Distributed Denial of Service Attack Mitigation Configuration Updating Method ⟋—900

Identify network traffic indicating an L7 DDoS attack against one or more portions of a computing services environment —902

Determine configuration information for the computing services environment —904

Activate one or more L7 DDoS attack mitigation configurations based on the configuration information —906

Upon determining that the L7 DDoS attack has subsided, deactivate L7DDoS one or more attack mitigation configuration based on the configuration information —908

Done

Figure 9

SYSTEM AND METHODS OF DEFENSE AGAINST DDOS ATTACKS FOR APPLICATIONS ON A MULTI-SUBSTRATE MULTI-INGRESS SHARED INFRASTRUCTURE WITH MULTIPLE CLOUD ARCHITECTURES

CROSS-REFERENCE TO RELATED APPLICATIONS

This application is a continuation-in-part of U.S. patent application Ser. No. 18/759,047 by Bansal and Singh, titled: "System and Methods of Defense Against DDoS Attacks For Applications On a Multi Substrate Multiingress Shared Infrastructure", filed on Jun. 28, 2024, which is incorporated herein by reference in its entirety and for all purposes.

FIELD OF TECHNOLOGY

This patent application relates generally to network attack detection and mitigation, and more specifically to application layer defense of a shared infrastructure against a distributed denial of service attack.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks. For example, users may interact with website hosting services implemented in cloud comp environments to access website. Such interactions may be conducted via any of various types of devices, such as mobile devices and/or computer systems. Given the prevalence of application layer Distributed Denial of Service (DDoS) attacks, improved techniques for detecting and mitigating DDoS attacks with database systems are desired.

BRIEF DESCRIPTION OF THE DRAWINGS

The included drawings are for illustrative purposes and serve only to provide examples of possible structures and operations for the disclosed inventive systems, apparatus, methods, and computer program products for application layer detection and mitigation of a distributed denial of service attack on a shared infrastructure. These drawings in no way limit any changes in form and detail that may be made by one skilled in the art without departing from the spirit and scope of the disclosed implementations.

FIG. 1 illustrates an overview method for application-layer distributed denial of service attack detection and mitigation, performed in accordance with one or more embodiments.

FIG. 9 illustrates an overview method for application-layer distributed denial of service attack mitigation configuration, performed in accordance with one or more embodiments.

DETAILED DESCRIPTION

Introduction

Figure 2:
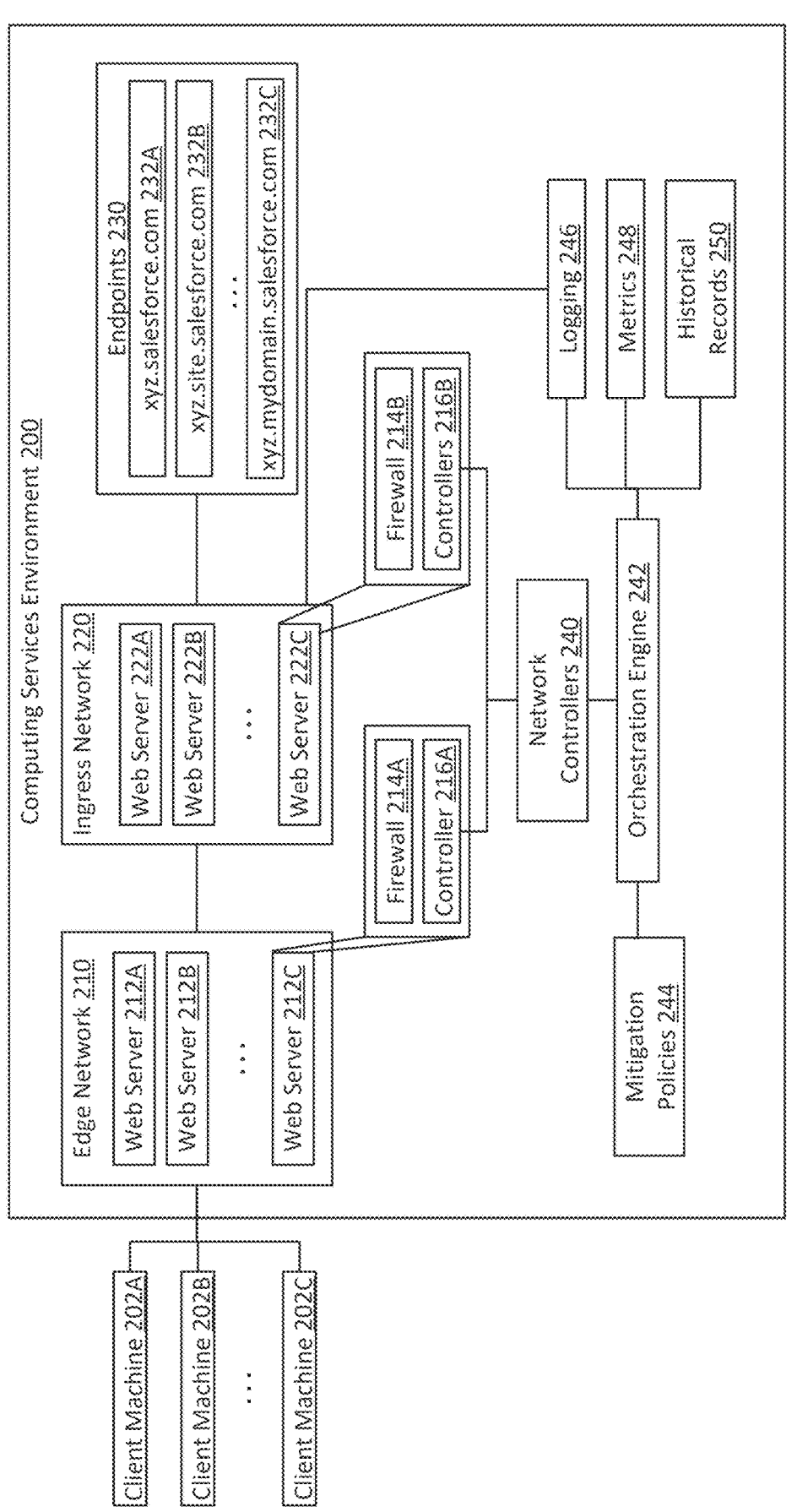
FIG. 2 illustrates one example of a computing services environment, configured in accordance with one or more embodiments.

Techniques and mechanisms described herein provide for an application-layer DDoS attack detection and mitigation system for a shared infrastructure. A DDoS attack disrupts the availability and resources available to endpoints. To address this problem, techniques and mechanisms describe herein provide for detecting the attack and then determining and implementing an appropriate mitigation policy across potentially multiple ingress paths to the shared infrastructure. The system may determine the severity of the attack based on the traffic spike using historical data. The system may also use one or more artificial intelligence models throughout the detection and mitigation phases of the system to improve the confidence in its suggestions.

Techniques and mechanisms described herein provide for adaptive, rapid transition between offline and online DDoS monitoring and prevention. In some embodiments, a web application firewall may be maintained in an offline or monitoring-only state. Then, upon receiving an instruction generated by an orchestrator, the web application firewall may be activated for traffic monitoring. In this way, the delay and cost associated with employing a web application firewall for traffic monitoring and attack mitigation may be limited to situations in which such monitoring and attack mitigation is indicated. Such adaptive control may be applied to a variety of contexts, including configurations involving a public cloud provider, a first party cloud provider, a cloud-native web application firewall, a web application firewall implemented in a sidecar configuration, and/ or other types of configurations.

In today's cybersecurity landscape, the increasing frequency and complexity of Layer 7 Distributed Denial of Service (L7 DDoS) attacks demand advanced defensive strategies. Layer 7 refers to the top layer in the 7-layer Open Systems Interconnection (OSI) Model of the Internet. It is also known as the "application layer." Layer 7 is the top layer of the data processing that occurs just below the surface or behind the scenes of software applications. For example, login requests, HTTP requests and responses used to load webpages, and other such high-level messages are layer 7 events. An L7 DDoS attack is a strategy that involves sending many malicious application-layer requests in an effort to overwhelm recipient web servers and undermine the services that they provide.

L7 DDoS attacks are particularly challenging to address because responding to an application layer message typically requires many more resources than transmitting an application layer request. For example, sending a login request or a webpage request typically involves few resources and limited network traffic, while operations such as processing a login request, generating a webpage, and sending a webpage typically involve many more processing and network resources. This discrepancy in resource utilization also makes L7 DDoS attacks are particularly attractive to attackers.

Attacks targeting the application layer significantly jeopardize the continuity and reliability of services and infrastructure. Conventional solutions often rely on manual intervention, where engineers review attack event data and correlate it with historical trends and data to distinguish genuine traffic increases from malicious L7 DDoS activities. The overall handling of an incident requires additional steps that again heavily lean on human intervention. These manual methods are not only prone to errors but also demand substantial time and resources. For example, the process of addressing these incidents requires the coordination of multiple teams across incident response bridges, significantly increasing the operational costs associated with detection and remediation. More critically, these incidents can have a profound impact on business operations and erode customer trust, posing substantial risks to long-term business sustainability and customer relationships.

Conventional approaches for addressing L7 DDoS attacks suffer from various deficiencies. For example, rate limiting-based solution for limiting attack traffic, such as Ngnix, typically do not differentiate the benign traffic or attack traffic during rate limiting and require significant manual configuration. For a deployment where hundreds of thousands of domains are hosted, using such a solution is impractical and due to the significant manual intervention needed, which would lead delays in detection and require significant resources. As another example, conventional public cloud DDoS solutions typically do not support specific policies for traffic directed to particular domains and do not support precise detection and mitigation actions. Such limitations again make these solutions ineffective and require significant manual intervention. Commercial DDoS solutions often rely on limited, current traffic data to make decisions and have high chances of false positives and disrupting benign customer traffic during the attack.

To address such challenges, techniques and mechanisms described herein provide for a robust system capable of swiftly detecting, evaluating, and countering L7 DDoS threats with minimal manual input. Automated and intelligent decision-making is harnessed to enhance accuracy, reduce response times, and lower the reliance on extensive human involvement in the threat mitigation process. The system directly addresses the rising frequency and complexity of Layer 7 Distributed Denial of Service (L7 DDoS) attacks. Unlike conventional solutions that depend heavily on manual intervention and retrospective analysis—approaches that are not only time-consuming and resource-intensive but also prone to inaccuracies—techniques and mechanisms described herein provide for automated detection, evaluation, and mitigation of L7 DDoS threats. By integrating intelligent decision-making algorithms that analyze real-time traffic and historical data, the system can swiftly distinguish between legitimate traffic surges and potential DDoS activities. Furthermore, the system's capacity to autonomously implement countermeasures significantly reduces the incident response time, reducing the risk to service continuity and infrastructure reliability. Thus, techniques and mechanisms described herein improve the functioning of cloud computing platforms, reduce the operational burden on cybersecurity teams, enhance the accuracy of threat detection and mitigation, and preserve the integrity of digital services against the backdrop of an evolving threat landscape.

In conventional enterprise environments, Layer 7 (L7) application protection against Distributed Denial of Service (DDoS) attacks may be achieved through various approaches including inline network devices, sidecar containers in Kubernetes deployments, and cloud-native traffic processing services offered via subscription models. Each of these methods involves operating in an inline mode, where incoming traffic is decrypted and scrutinized using signature matching or other pattern recognition techniques to identify and mitigate potential DDoS threats. Such approaches have significant drawbacks, including increased latency due to the processing of L7 packets, reduced network traffic throughput, high computing resource utilization, and significant operational costs.

Techniques and mechanisms described herein provide for an adaptive DDoS defense mechanism suitable for a multi-substrate architecture. Unlike conventional solutions that operate continuously in inline mode, various embodiments described herein employ an out-of-band approach. The system can remain passive during normal operations, thereby avoiding the latency and throughput penalties associated with traditional continuously operating inline methods. However, protection may be rapidly activated in response to a detected DDoS incident, ensuring robust protection without the typical drawbacks.

Various embodiments described herein may include one or more elements related to adaptive activation of application layer DDoS protection. For example, an out-of-band, reduced-capacity system may be deployed alongside the application. This system can be quickly scaled and transitioned from a "monitoring" mode to an "active" mode in response to a DDoS event. As another example, a DDoS detection mechanism may analyze traffic patterns, generating alerts upon identifying potential threats. As yet another example, an orchestrator component processes alerts generated by the DDoS protection mechanism and triggers the necessary system changes, including switching from monitoring to active mode and scaling the defense capabilities according to the traffic demands. For cloud-native services, this orchestrator can also activate the appropriate subscription-based protection services as needed.

In some embodiments, techniques and mechanisms described herein may facilitate effective DDoS protection in a shared infrastructure environment, where it can selectively target the attacked resources with minimal impact on the performance of other customers. Thus, various embodiments described herein may be particularly adaptive to multitenant computing services environments.

In some embodiments, by remaining inactive during normal operations, the system can avoid adversely affecting characteristics such as latency, throughput, and operational costs until a DDoS event occurs. Then, once the threat subsides, the system can revert to its original state, further optimizing resource use and performance. Thus, various embodiments described herein provide an adaptive, scalable, and cost-effective approach for DDoS, offering robust security without the typical performance trade-offs of traditional L7 application protection methods.

In some embodiments, techniques and mechanisms described herein provide for automated mitigation strategy formulation and implementation. The system can not only identify and evaluate threats but also autonomously formulate and execute mitigation strategies. Such strategies may involve includes dynamic adjustments to traffic handling and rate limiting based on the nature of the detected threat, without requiring manual intervention.

In some embodiments, techniques and mechanisms described herein provide for IP reputation assessment and heuristic analysis. Incorporating IP reputation data and heuristic analysis for evaluating the threat level of incoming traffic adds a layer of sophistication, enabling the framework to more effectively identify and prioritize threats based on their origin and behavior patterns.

In some embodiments, techniques and mechanisms described herein provide post-mitigation analysis and reporting. After action is taken, the system may automatically generate one or more comprehensive reports detailing the attack, the response actions taken, and/or recommendations for future improvements. Such an approach helps to provide for future learning and system enhancement without manual data compilation and analysis.

In some embodiments, techniques and mechanisms described herein facilitate attack detection and mitigation with minimal manual oversight. By significantly reducing the need for human intervention in the detection, analysis, and mitigation processes, the system offers a cost-effective, efficient, and less error-prone alternative to conventional solutions that depend heavily on cybersecurity teams.

In some embodiments, techniques and mechanisms described herein provide for an adaptive and scalable architecture. The system can adapt to evolving threats and scale as necessary to handle varying levels of traffic and attack intensity, providing flexibility and robustness unmatched by more static or manual solutions.

Consider the example of John, an IT professional at a cloud computing service provider providing computing services to various entities via the Internet. John is responsible for ensuring the robustness and security of the institution's digital infrastructure. One of his critical tasks is detecting and mitigating Layer 7 (L7) application layer DDoS attacks, which target the application layer to disrupt services by overwhelming them with malicious traffic. When using conventional approaches, John's efforts are complicated by the shared nature of the cloud computing provider's infrastructure. For instance, a DDoS attack may target only a single entity via a few ingress paths but may negatively affect services to multiple entities across the platform. Accordingly, John's efforts require significant manual intervention and risk negatively affecting the service of entities on the platform other than the targeted entity.

In contrast to conventional techniques, techniques and mechanisms described herein provide for an advanced L7 DDoS attack detection and mitigation system to streamline John's efforts. This system utilizes machine learning algorithms to analyze traffic patterns in real-time, distinguishing between legitimate user activity and potential threats. By providing detailed analytics and automated responses, the system allows John to swiftly identify and block malicious traffic without affecting access by legitimate users. The ability to configure specific thresholds and adaptive learning models means that the mitigation strategies evolve alongside emerging threats, significantly reducing downtime and enhancing the user experience. With this sophisticated tool, John can proactively protect the shared infrastructure from complex DDoS attacks, ensuring continuous service availability and strengthening the overall security posture. As used herein, the term "multiple" refers to two or more.

FIG. 1 illustrates an overview method 100 for application-layer distributed denial of service attack detection and mitigation, performed in accordance with one or more embodiments. According to various embodiments, the method 100 may be performed at a computing services environment such as the computing services environment 200 shown in FIG. 2. DDoS attacks may take place in a variety of ways including, and not limited to, spurious requests sent via a one or more client machines to one or more domains via one or more communication channels during one or more time-ranges.

Application-layer request messages received at the computing services environment are identified at 102. The request messages are each received from a respective source via a respective ingress path and directed to a respective domain accessible via the computing services environment. In some embodiments, a given request message may be non-malicious. For example, a user may be attempting to log into their corporate email account from their work device. However, some request messages may instead be classified as malicious. For example, one or more client machines may be sending request messages to one or more domains to intentionally erode performance. Additional details regarding the identification of application-layer request messages received at the computing services environment are discussed with respect to the method 300 shown in FIG. 3.

One or more mitigation policies are determined at 104. According to various embodiments, the policies are determined based on a classification of a subset of the application-layer request messages as being malicious. The mitigation policies may correspond with the ingress paths and including one or more rules to prevent a subset of subsequent application-layer request messages from reaching one or more components within the computing service environment. Mitigation policies may be determined by one or more techniques. For example, a determination process may include historical information on a domain endpoint. As another example, the mitigation policy may be determined by evaluating the performance of the selected mitigation policy and determining if modification need to be made.

Figure 7:
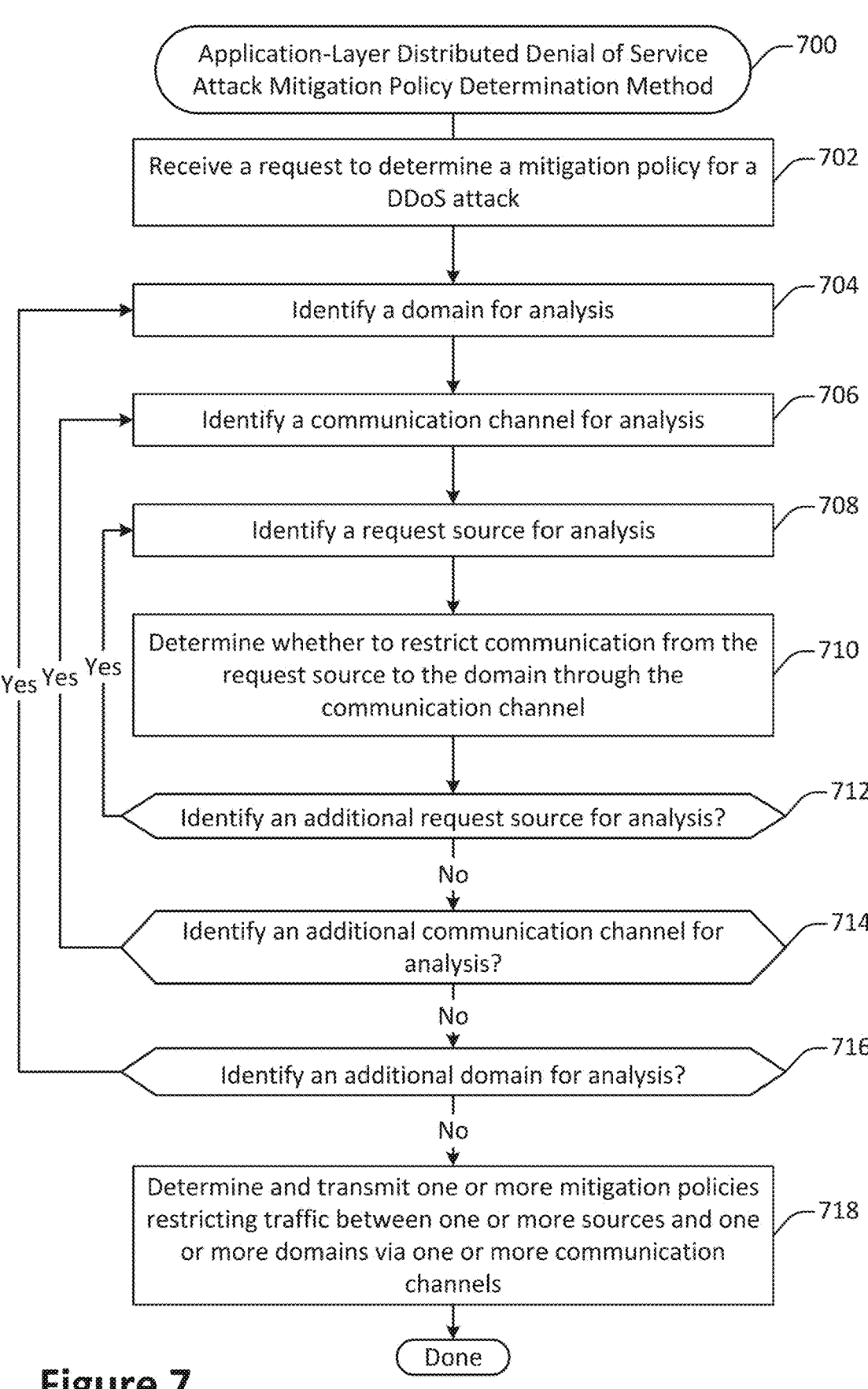
FIG. 7 illustrates a method of determining an application-layer distributed denial of service attack mitigation policy, performed in accordance with one or more embodiments.

Additional details regarding the mitigation policy determination are discussed with respect to the method 700 shown in FIG. 7.

One or more instructions are transmitted to one or more controllers at 106. According to various embodiments, the instructions contain relevant information for implementing the mitigation policies at the controllers. For example, a mitigation policy that throttles the malicious traffic of a client-machine may instruct the one or more controllers to limit the malicious traffic that is being processed by the edge network. As another example, a mitigation policy may contain instructions to a controller to divert non-malicious traffic to a different webserver. Additional details regarding the implementation of the mitigation policy are discussed with respect to the method 500 shown in FIG. 5.

It should be noted that the method 100, as well as more generally other techniques and mechanisms described herein, may be applied to a portion of a computing services environment rather than to an entire computing services environment. For instance, traffic may be analyzed and attacks may be identified and mitigated on any of various levels. Such levels may include one or more of: one or more domains, one or more application servers, one or more geographic locations, one or more service types, one or more service recipients, one or more network ingress paths, one or more traffic sources, and/or any other element through which a computing services environment interacts with external machines to provide computing services.

DDoS Mitigation Architecture

FIG. 2 illustrates one example of a computing services environment 200. According to various embodiments, the computing services environment 200 includes an edge network 210, an ingress network 220, a set of domain endpoints 230, network controllers 240, an orchestration engine 242, mitigation policies 244, a logging database 246, a metrics database 248, and historical records 250. The edge network 210 and ingress networks 220 contain one or more web servers depicted as edge network web servers (212A, 212B, and 212C) and ingress network web servers (222A, 222B, and 222C). The domain endpoints 230 containing one or more domain endpoints depicted as (232A, 232B, and 232C). Each web server contains a firewall 214, and a controller 216. The edge network webserver 212C includes a firewall 214A and a controller 216A, while the ingress network webserver 222C includes a firewall 214B and a controller 216B. Additional details regarding various elements that may be included in a computing services environment are discussed with respect to FIG. 4, FIG. 15A, FIG. 15B, and FIG. 16.

The one or more client machines (202A, 202B, and 202C) interact with one or more domain endpoints (232A, 232B, and 232C) via the computing services environment 200. In some embodiments, the interaction includes one or more client requests routed via a communication channel including a webserver (212A, 212B, and 212C) from the edge network 210, to the ingress network (220).

According to various embodiments, the edge network 210 receives one or more requests to access one or more domain endpoints from one or more client machines from across the internet. The edge network then routes the request traffic from the client machine to the appropriate web server in the ingress network to eventually reach the endpoint. However, a combination of client machines may instigate a DDoS attack on the computing services environment by intentionally sending spurious traffic to one or more domain endpoints. For example, malicious traffic may be caused by one or more cybersecurity attack techniques.

The edge network 210 includes one or more web servers (212A, 212B, and 212C). The web server 202 contains a firewall 214A and a controller 216A. Thus, the edge network may contain a separate layer of security. For example, a web server inside the edge network may contain a separate firewall to filter requests. As another example, the edge network may have a dedicated firewall filtering requests before they reach dedicated web servers that connect to the ingress network.

According to various embodiments, the ingress network 220 contains one or more webservers that connect to one or more domain endpoints 230. For example, the ingress network connects the requests sent from the client machines to one or more domain endpoints.

In some embodiments, the ingress network may contain a separate layer of security. For example, a web server inside the ingress network may contain a separate firewall to filter requests. As another example, the ingress network may have a dedicated firewall filtering requests before they reach dedicated web servers that connect to the domain endpoints.

In some embodiments, the ingress network 220 may be a separate network than the edge network. For example, in computing service environments with heavy traffic, a dedicated ingress network may manage the traffic from one or more client machines to one or more domain endpoints via one or more web servers in an edge network and via one or more web servers in an ingress network.

According to various embodiments, the domain endpoints 230 contains domain web addresses that may be accessible via the internet. One or more domain endpoints (232A, 232B, and 232C) are available in the domain endpoint set 230.

According to various embodiments, different domain endpoints may experience different traffic volumes. For example, a popular website may experience more traffic than a newly created website. As another example, a newly created website may experience more traffic than expected based on its popularity prior to launch.

In some embodiments, a domain endpoint may be a subdomain of a parent domain. For example, salesforce.com may be considered a parent domain to the child domain mail.salesforce.com.

According to various embodiments, the network controllers 240 may contain one or more controllers to update the controllers of one or more web servers in one or more networks. For example, the network controller may update the security of a web server based on a mitigation policy. As another example, the network controller may update one or more web server controllers to aid with the firewall protection depending on mitigation policies enacted by the orchestration engine.

In some embodiments, the network controllers may control the edge and/or ingress networks. For example, a mitigation policy may make amendments to a webserver in the ingress network. As another example, a mitigation policy may make amendments to the firewall of a web server in the edge network.

According to various embodiment, the orchestration engine 242 detects and mitigates any application-layer DDoS attacks via communication to one or more services. For example, the orchestration engine may communicate with one or more services from the logging database, metrics database, historical records, and the mitigation policies to aid with the detection and mitigation of application-layer DDoS attacks.

In some embodiments the orchestration engine 242 may include one or more services running on one or more machines working to detect and mitigate application-layer DDoS attacks. For example, having a dedicated service to detect attacks, a dedicated service to mitigate the attack, and a separate service to generate reports. As another example, the training and/or deployment of an artificial intelligence model may be done in a separate service. As yet another example, the orchestration engine may send a web server a mitigation policy via one or more of the network controllers 240.

According to various embodiments, the mitigation polices 244 may include policies to aid with the mitigation of application-layer DDoS attacks. For example, some mitigation policies may contain polices regarding the throttling traffic from one or more client machines, staggering traffic, re-directing traffic, adding client machine information to a list for future reference. As another example, a mitigation policy may add one or more client machine information to a block list to prevent future traffic from causing a DDoS attack.

According to various embodiments, the logging database 246 may store logging information from any element inside the computing services environment. For example, logs may contain relevant data such as client machine information, domain endpoints accessed, and duration of connection.

According to various embodiments, the metrics database 248 may contain any metrics that aid with the detection and mitigation of application-layer DDoS attacks. For instance, the metrics database may include data reflecting measured performance at one or more elements in the computing services environment.

According to various embodiments, the historical records 250 may contain any information required to detect and mitigate application-layer DDoS attacks. For example, historical information may be stored such as traffic spikes information, previous mitigation policies, mitigation policy success rate, and incident reports.

Figure 3:
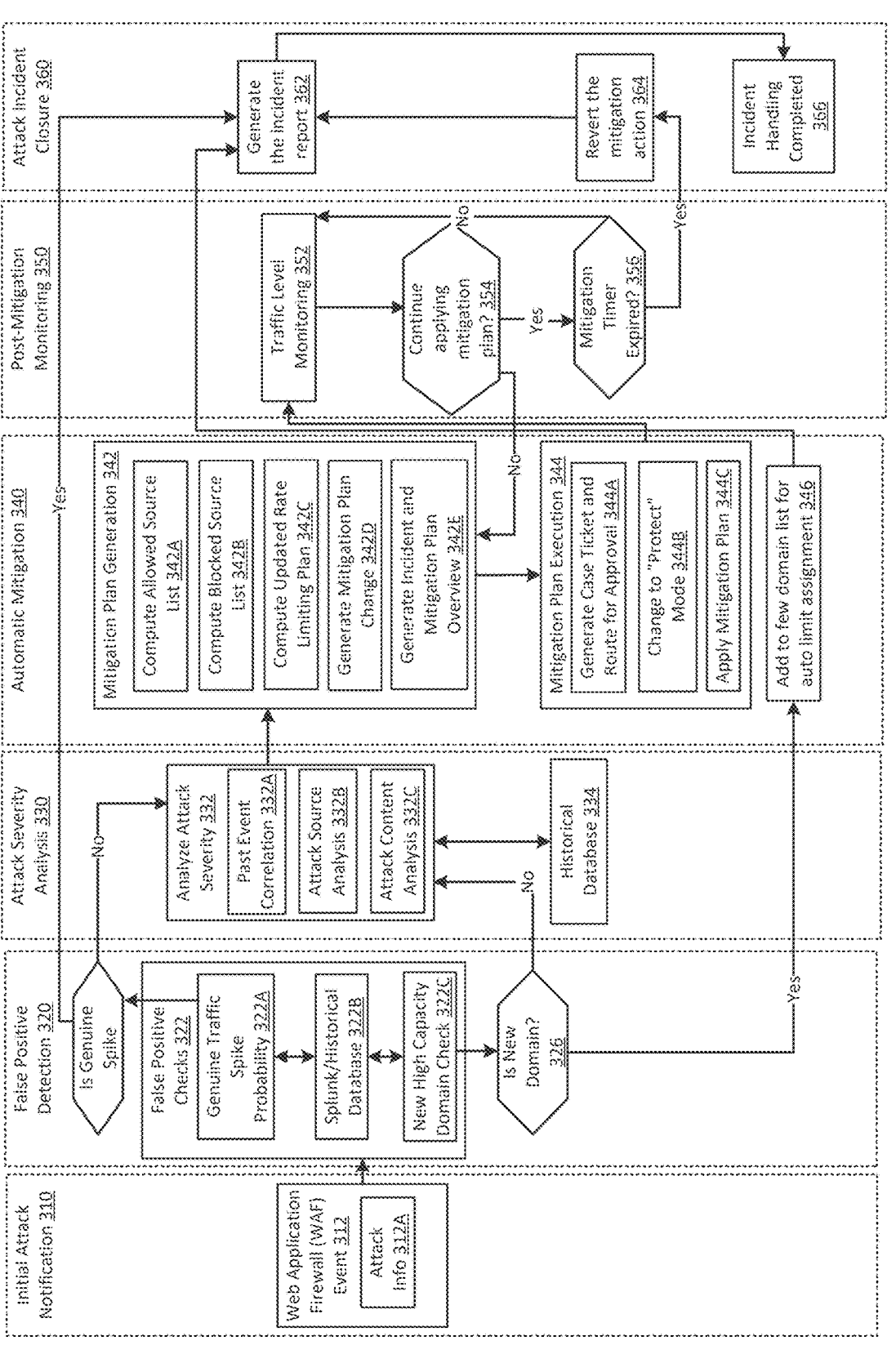
FIG. 3 illustrates an example of an overview flowchart illustrating various operations performed in the course of identifying and mitigating an application-layer DDoS attack, configured in accordance with one or more embodiments.

FIG. 3 illustrates an example of an overview flowchart 300 illustrating various operations performed in the course of identifying and mitigating an application-layer DDoS attack, configured in accordance with one or more embodiments. According to various embodiments, the overview diagram 300 includes the following phases: an initial attack notification phase 310, a false positive detection phase 320, an attack severity analysis phase 330, an automatic mitigation phase 340, a post-mitigation monitoring phase 350, and an attack incident closure 360 phase.

The initial attack notification phase 310, includes a Web Application Firewall (WAF) event 312. The WAF event may include information about the status of the web application firewall including any attack information 312A. In some embodiments, the attack information 312A includes information used to detect and mitigate an application-layer DDoS attack. For example, the attack information may include information about the client machine(s), endpoints domains, edge network, and ingress network. Additional details regarding the initial attack notification are discussed with respect to the method 500 shown in FIG. 5.

According to various embodiments, the false positive detection phase at 320 involves a false positive check at 322, a determination as to the genuineness of a traffic spike at 324, and a determination as to whether the traffic is related to a new domain 326. The false positive check at 322 may involve calculating the probability that the traffic spike is genuine at 322A, identifying one or more reference historical records at 322B, and/or performing a new high capacity domain check 322C. Additional details regarding the false positive detection phase are discussed with respect to the method 600 shown in FIG. 6.

According to various embodiments, the attack severity analysis phase 330 may involve analyzing attack severity at 332 and/or communicating with the historical database 334. Analyzing attack severity at 332 may involve one or more of past event correlation 332A, attack source analysis 332B, and attack content analysis 332C. Additional details regarding the attack severity analysis are discussed with respect to the method 700 shown in FIG. 7.

According to various embodiments, the automatic mitigation phase 340 may involve one or more of the generation of a mitigation plan at 342, the execution of the mitigation plan at 344, and assigning a threshold for a new domain at 346. Additional details regarding such operations are discussed with respect to the method 600 shown in FIG. 6.

According to various embodiments, mitigation plan generation 342 may involve one or more of determining an allowed source list 342A, determining a blocked source list 342B, and/or determining an updated rate limiting plan 342C, generating a mitigation plan change 342D, and generating an incident and mitigation plan overview 432E. That is, mitigation plan generation may involve classification of the sources of messages.

In some embodiments, one set of sources may be classified as "bad", or believed to be associated with malicious behavior. Bad sources may be identified based on any of a variety of information or characteristics. For example, a source associated with an internet protocol (IP) address that has been predetermined as being associated with malicious activities may be identified as bad. As another example, a source that requests access to various URLs that are not actually served by the computing services environment may be identified as bad. As yet another example, a source that repeatedly submits login requests that are rejected by the system may be identified as bad. As still another example, a source that accesses many different domains in a short period of time may be identified as bad. More generally, a source may be identified as bad by questionable behavior at the network layer, the transport layer, and/or the application layer of the Open Systems Interconnection model.

According to various embodiments, sources identified as bad may be blocked, at least temporarily, from sending future requests to one or more components of the computing services environment. For instance, a source identified as bad may be restricted from sending requests to an application via a mitigation policy imposed at an edge network and/or ingress network web server, at least for a period of time.

In some embodiments, one set of sources may be classified as "good." Good sources may be those identified as having transmitted requests identified as normal. For example, a source that transmits a login request that successfully authenticates to the system may be identified as good. As another example, a source that transmits a small number of requests for URLs that are actually served by the computing services environment may be identified as good. More generally, source may be identified as good based on behavior at the network layer, the transport layer, and/or the application layer of the Open Systems Interconnection model.

In some embodiments, one set of sources may be classified as "unknown." Unknown sources may be those for which insufficient information is available for a definitive classification. Initially, for instance at the beginning of a distributed denial of service attack, a potentially large portion of incoming requests may be received from sources classified as unknown. However, many such sources may be subsequently classified as either good or bad as more information becomes available.

In some embodiments, unknown sources may be subjected to rate limiting or other forms of traffic shaping. For instance, rate limiting for unknown sources may be increased in proportion to the severity of the distributed denial of service attack to help ensure that service can continue to be provided to sources identified as good. Additional details regarding such operations are discussed with respect to the method 700 shown in FIG. 7.

According to various embodiments, mitigation plan execution 344 may involve one or more of generating a case ticket and route for approval 344A, changing to "protect" mode 344B, and applying mitigation plan 344C. Additional details regarding mitigation plan execution are discussed with respect to the method 500 shown in FIG. 5.

According to various embodiments, the post-mitigation monitoring phase 350 may involve traffic level monitoring 352, determining whether to continue applying mitigation plan 354, and determining whether to continue traffic level monitoring based on the expiration of the mitigation timer at 356. Additional details regarding post-mitigation strategy monitoring are discussed with respect to the method 800 shown in FIG. 8.

According to various embodiments, they attack incident closure 360 phase may involve one or more of generating an incident report 362, reverting the mitigation action at 364 based on the expiration of the migration timer 356, and completing incident handling at 366. Additional details regarding such operations are discussed with respect to the method 800 shown in FIG. 8.

Figure 4:
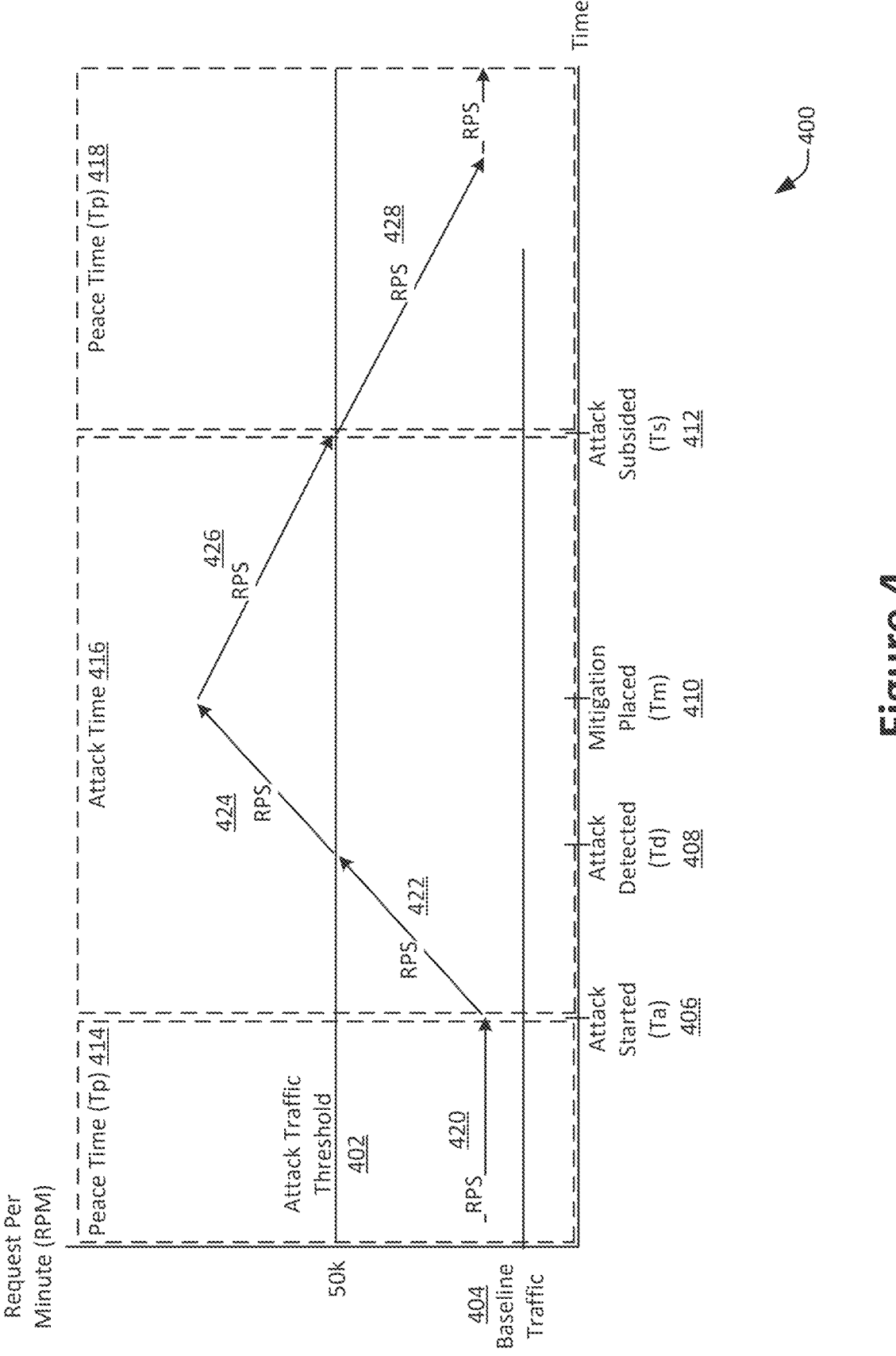
FIG. 4 illustrates one example of a response diagram, generated in accordance with one or more embodiments.

FIG. 4 illustrates one example of a response diagram 400, configured in accordance with one or more embodiments. According to various embodiments, the response diagram 400 depicts an example of a lifecycle of an L7 DDoS attack, including a peace time before an attack has started 414 followed by the time under which the DDoS attack is taking place 416 and a subsequent peace time 418. A sample attack traffic threshold is shown at 402, a baseline traffic level is shown at 404, and a line plotting requests per minute traffic is shown at 420, 422, 424, 426, and 428. The x-axis represents time and the y-axis represents request per minute for a given domain endpoint. The response diagram 400 may be determined based on information extracted from logs, metrics, historical data and may be used to visually represent the phases through which a hypothetical application-layer DDoS attack traverses.

A peace time phase is depicted at 414. According to various embodiments, the requests per minute 420 and the baseline traffic 404 does not exceed attack traffic threshold. The peacetime phase ends when the attack has started at 406.

An attack time phase is depicted at 416. The traffic begins to increase at 422 relative to the peacetime traffic 420. The attack started time 406 is the time the attack is estimated to have started based on when the traffic begins to increase due to the attack. The attack is detected at 408 when the traffic 422 exceeds the attack traffic threshold 402. The attack mitigation strategy generation method is executed when the attack is detected at 408, leading to the implementation of a mitigation plan at 410. After the mitigation plan is placed at 410, the traffic 426 reduces until the traffic has subsided at 412, when the traffic is below the attack traffic threshold 402.

A peace time phase is depicted at 418. According to various embodiments, the peace time phase occurs when the attack has subsided. The attack may be determined to have subsided when the traffic is below the attack traffic threshold 402. The traffic 428 may continue to decrease until it reaches levels similar to that of traffic 420, before the attack took place, or the baseline traffic at 404.

DDoS Mitigation Processes

Figure 5:
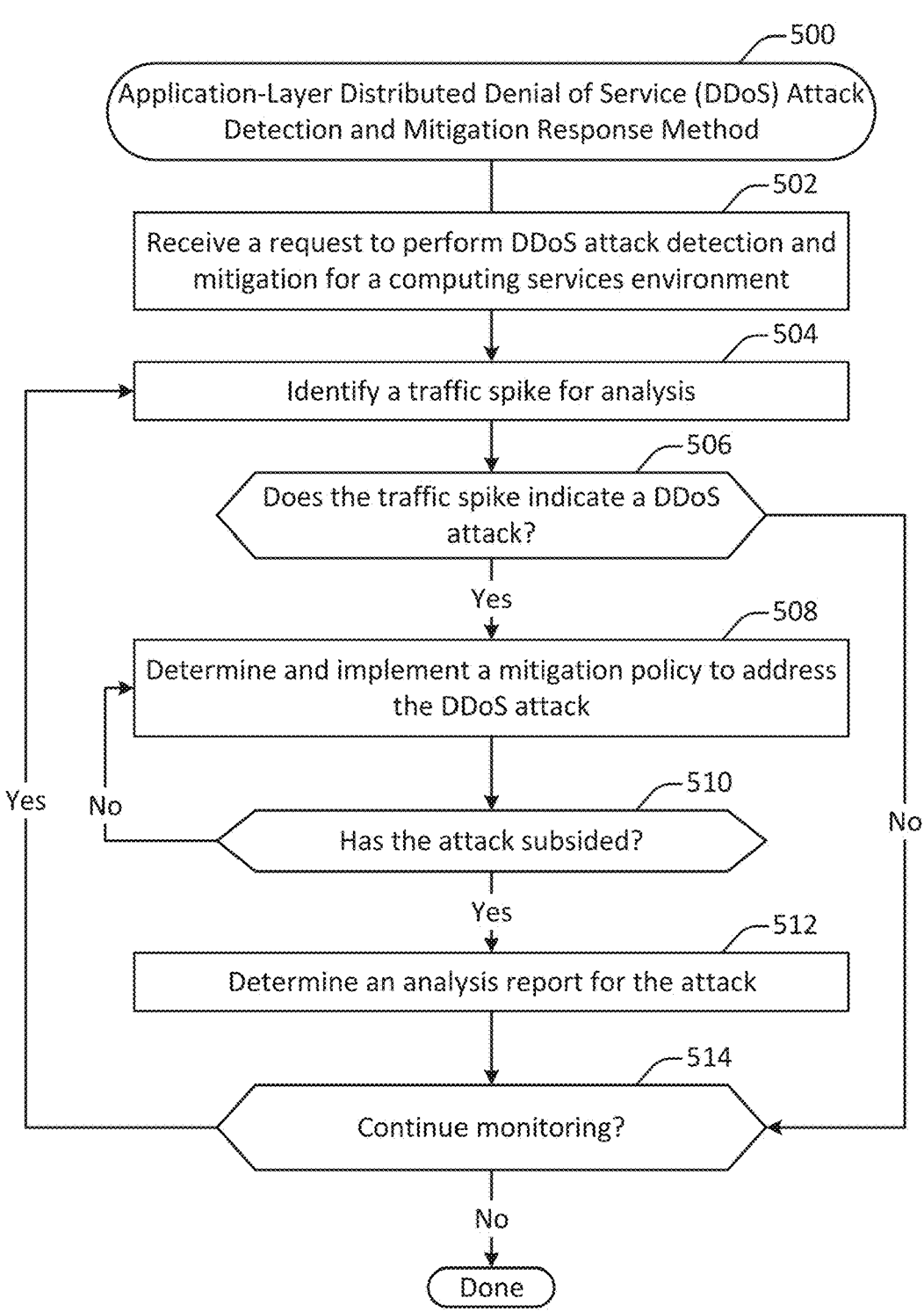
FIG. 5 illustrates a method of application-layer distributed denial of service attack detection and mitigation response, performed in accordance with one or more embodiments.

FIG. 5 illustrate a method 500 for detecting and mitigation an application-layer distributed denial of service attack, performed in accordance with one or more embodiments. According to various embodiments, DDoS attack detection and mitigation may involve operations such as determining if a traffic spike indicates a DDoS Attack, determining and implementing a DDoS mitigation policy, verifying if the attack has subsided, and determining an analysis report. The method 500 may be performed at the computing services environment 200 shown in FIG. 2, for instance at the orchestration engine 242.

A request to perform DDoS attack detection and mitigation for a computing services environment is received at 502. The request may be triggered depending on conditions occurring in other parts of the computing services environment 200. In some embodiments, the request may be triggered depending on the volume of traffic. For example, the request may be triggered whenever the traffic volume for a given set of domains exceeds threshold. As another example, the request may be triggered whenever a change in rate of traffic for a given set of domains exceeds a rate change threshold.

According to various embodiments, the request may be triggered depending on characteristics of the computing services environment 200. For example, one or more domains may be more prone to DDoS attacks. As another example, one or more channels may be particularly prone to DDoS attacks, for instance based on the resources available at a given time or the domains accessible via the one or more channels.

A traffic spike is identified for analysis at 504. A traffic spike may include traffic from one or more sources to one or more endpoints via one or more channel paths. In some embodiments, the traffic identified for analysis may include additional traffic. For example, traffic leading up to the traffic spike may also be identified for analysis.

According to various embodiments, some or all of the traffic may be identified for analysis. For example, some traffic, such as traffic predetermined as valid, may be filtered out when analyzing the traffic spike.

A determination is made at 506 as to whether the traffic spike indicates a DDoS attack. According to various embodiments, the classification of a traffic spike being a DDoS attack may involve one or more of various techniques. For example, non-malicious traffic may be filtered out. As another example, one or more data augmentation techniques may be employed, for instance to determine supplemental metadata characterizing the traffic. As another example, synthetic data may be generated to aid in the evaluation, for instance if suitable comparison data is limited.

In some embodiments, a traffic spike classification technique may involve using one or more artificial intelligence models (e.g. classification models) to classify some or all of the traffic. Alternatively, or additionally, traffic spike classification may involve historical information. For example, historical trends and/or previous traffic spike classifications may also aid with classification.

A mitigation policy to address the DDoS attack is determined and implemented at 508. According to various embodiments, the determination of a DDoS attack mitigation policy may involve one or more techniques, for instance techniques involving one or more artificial intelligence and/or machine learning models. For example, the mitigation policy may be determined by using machine learning to predict the probability of success for a mitigation policy. As another example, machine learning model may be used to classify the type of attack to improve the determination operation. As yet another example, a large language model may be used to generate some or all of the mitigation policy and/or a description of the mitigation policy.

In some embodiments, the implementation of the mitigation policy to address the DDoS attack may involve sending instructions to one or more network controllers. For example, upon receiving the mitigation policy, the network controllers may begin to throttle the traffic from one or more sources, ultimately mitigating the DDoS attack. As another example, the network controllers may include instructions from the mitigation policy to amend the firewall of a web server, ultimately mitigating the DDoS attack.

In some embodiments, the network controllers may implement some or all of the mitigation policy at a future point in time. For example, mitigation policy may include one or more instructions to execute at a predetermined time. Alternatively, or additionally, the network controllers may implement some or all of the mitigation policy upon receiving the policy.

A determination is made at 510, as to whether the attack has subsided. According to various embodiments, one or more of various techniques may be employed to evaluate if the attack has subsided. The traffic volume may be used as a metric to guide the determination. For example, the overall traffic volume may be compared against a threshold to determine if an attack has subsided. As another example, the reduction in traffic volume from one or more sources may also indicate the DDoS attack has subsided. As yet another example, the rate of change in traffic volume may also be used to determine if a DDoS attack has subsided.

An analysis report is determined for the attack at 512. The analysis report may contain relevant information about the DDoS attack, mitigation strategy, and other information to provide a holistic report. Some or all of the analysis report may be stored for future reference.

In some embodiments, the analysis report may be used to improve the determinations made by the orchestration engine 242. For example, the orchestration engine may interpret historical analysis reports to improve the determinations made during the mitigation strategy determination.

In some embodiments, the one or more analysis reports may be transmitted to appropriate entities. For example, one or more analysis reports may be transmitted to other services or to a human network administrator. As another example, one or more analysis reports may be transmitted to one or more entities accessing services via the computing services environment 200.

A determination is made at 514, as to whether to continue monitoring. In some embodiments, monitoring may continue until a request to cease monitoring has been received. Alternatively, or additionally, monitoring may continue until a DDoS attack has been successfully mitigated.

Figure 6:
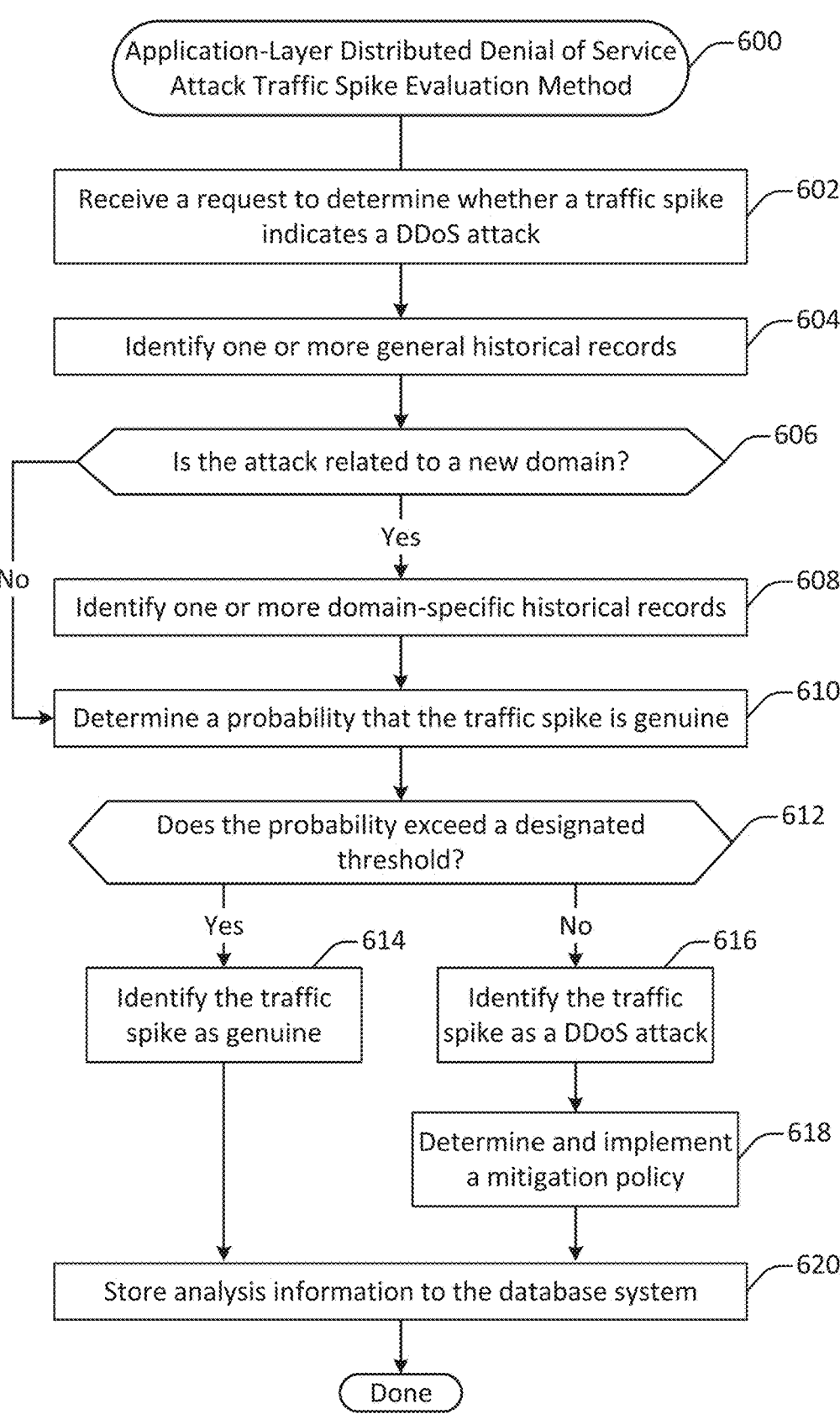
FIG. 6 illustrates a method of application-layer distributed denial of service attack traffic spike evaluation, performed in accordance with one or more embodiments.

FIG. 6 illustrates method 600 of evaluating an application-layer distributed denial of service attack traffic spike, performed in accordance with one or more embodiments. The method 600 may be performed at the computing services environment 200 shown in FIG. 2, for instance at the orchestration engine 202. The classification of a traffic spike may involve operations such as identifying one or more historical records, determining the probability the spike is genuine, comparing the probability with a designated threshold, and storing relevant analysis information.

A request to determine whether a traffic spike indicates a DDoS attack is received at 602. In some embodiments, the request may contain relevant information necessary to determine whether a traffic spike indicates a DDoS attack. For example, the request may contain information about the source, channel information, traffic spike thresholds, and domains.

One or more general historical records are identified at 604. In some embodiments, historical records may be used to classify the some or all of the traffic spike as genuine or a DDoS attack. For example, if traffic reflected in one or more pre-classified historical records matches some or all of the traffic spike, then the traffic spike may be classified similarly.

In some embodiments, historical records related to the traffic spike may be also identified. For example, historical records related to one or more sources of the traffic spike may be used to aid with traffic spike evaluation.

A determination is made at 606 as to whether the attack is related to a new domain. In some embodiments, the determination may be made based on a length of time that the domain has existed within the computing services environment 200. For instance, a domain that has existed for less than a predetermined period of time, such as one week or one month, may be classified as "new". Such a classification may help to determine the extent to which classification of the traffic spike is informed by historical records for the domain under analysis versus more general historical records covering various domains.

Upon determining that the attack is related to an existing domain, then one or more domain-specific historical records are identified at 608. In some embodiments, domain-specific historical records may include records about previous traffic spike evaluations. For example, domain-specific historical traffic spikes were determined to be genuine. If instead the attack is determined to not be related to an existing domain, then at 610 a probability that the traffic spike is genuine is determined. In some embodiments, the determination is made by looking up the domain associated with the traffic spike in the historical domain records.

In some embodiments, related domain-specific historical records may be identified when the domain is new. For example, if the new domain is an ecommerce website, related ecommerce website historical records are identified. As another example, if the new domain (e.g. mail.salesforce.com) is related to a main domain (e.g. salesforce.com) then the historical records of the main domain may be used instead.

Although the determination as to whether the domain is new is shown in FIG. 6 as being a binary determination, in practice the determination may be more continuous. For example, the more historical data is available for a given domain, the more such domain-specific historical data may be prioritized over more general historical data when evaluating traffic for the domain.

The probability that the traffic spike is genuine is determined at 610. According to various embodiments, the probability may be calculated in a variety of ways, including one or more techniques based in artificial intelligence, machine learning, and/or statistical analysis. For example, a machine learning classification model, logistic regression classifier model, linear probability model, or other such model may be pre-trained on historical data to classify traffic spikes as genuine or not based on previous classification information. In some configurations, an ensemble model combining various classifiers may be used.

According to various embodiments the probability the traffic spike is genuine may also be determined based on how much traffic the domain has received. For instance, newer domains have a higher probability of a traffic spike being genuine. Such information may be determined based on historical data and may be context specific, such as specific to particular industries or types of domains.

A determination is made at 612 as to whether the probability exceeded a designated threshold. In some embodiments, the confidence of the probability is also considered when determining the determination step. For example, given a machine learning model, if the confidence score of a traffic spike being classified as a DDoS attack is low, then the traffic spike may be initially identified as genuine and then reevaluated when new information becomes available.

Based on the determination made at 612, the traffic spike is identified as either genuine at 614 or a DDoS attack at 616. The identification of the traffic spike as a DDoS attack may trigger the determination and implementation of a mitigation policy at 618 as discussed with respect to the method 700 shown in FIG. 7.

Analysis information is stored on the database system at 620. According to various embodiments, the analysis information selected to be stored may include any relevant information created or determined during the traffic spike evaluation method. For instance, the analysis information stored may include information about the request received, any determinations made, and/or the traffic spike evaluation method.

According to various embodiments, the analysis information may also be referenced in part or full in related reports. For example, the traffic spike analysis report may be referenced in part or full in the mitigation analysis report. As another example, the traffic spike evaluation may also be used to train future models to improve the traffic spike evaluation method.

FIG. 7 illustrates method 700 of determining an application-layer distributed denial of service attack mitigation policy, performed in accordance with one or more embodiments. According to various embodiments, the DDoS attack mitigation policy determination may involve identifying a permutation of information containing a mixture of a domain, communication channel, and request source for which to restrict traffic, as well as any information about how traffic is to be restricted. The method 700 may be performed at the computing services environment 200 shown in FIG. 2, for instance at the orchestration engine 242.

A request to determine a mitigation policy for a DDoS attack is received at 702. The request may relevant information such as historical, source, timestamps, endpoint domain, channel, client machine(s), and any other relevant information required to determine a mitigation policy for a DDoS attack. The request may be generated as discussed with respect to the operation 618 shown in FIG. 6.

In some embodiments, a combination of potential DDoS attack signal combinations is selected to determine the attack mitigation policy. For example, a domain is identified for analysis at 704, a communication channel is identified for analysis at 706, and a request source is identified for analysis at 708. Such combinations may be identified an analyzed in parallel or in any suitable sequence.

A determination is made at 710, as to whether to restrict communication from the request source to the domain through the communication channel. In some embodiments, the determination may be made by using historical information. For example, the determination may use historical information about a given request source, communication channel, and/or domain to restrict communication. As another example, related historical information about a new domain may be used to determine whether to restrict communication.

In some embodiments, the determination to restrict communication from the request source to the domain through the communication channel may involve using a pre-determined threshold. For example, if the requests per minute for a given set of domains through a communication channel exceeds a threshold, traffic may be restricted. As another example, the threshold may be a variable threshold depending on, and not limited to, information such as domain, communication channel, request source, and time.

According to various embodiments, the determination to restrict communication from the request source to the domain through the communication channel may involve using one or more artificial intelligence models. For example, a machine learning model trained on historical data may be used to determine whether traffic from a particular source to a particular domain via a particular communication channel is genuine.

Upon determining whether to restrict communication channel from a request source to a domain via a communication channel, the analysis process may continue by determining if other combinations should be selected. A determination is made at 712, as to whether to identify an additional request source for analysis. A determination is made at 714, as to whether to identify an additional communication channel for analysis. A determination is made at 716, as to whether to identify an additional domain for analysis. As discussed herein, such combinations may be identified an analyzed in parallel or in any suitable sequence.

One or more mitigation policies are determined and transmitted at 718. The mitigation policies may involve restricting traffic between one or more sources and one or more domains via one or more communication channels.

According to various embodiments, the one or more mitigation policies may be transmitted to one or more of the network controllers 240 shown in FIG. 2. For instance, a mitigation policy may be transmitted to a network policy response for controlling a network component to which the mitigation policy applies.

In some embodiments, traffic may be blocked completion. For example, traffic from a particular source to a particular domain via a particular channel may be blocked at the edge network and/or ingress network level.

In some embodiments, a mitigation policy may throttle the traffic from the source flowing through the communication channel to the domain endpoint. For example, the mitigation policy may add a timeout feature to increase the time between requests from one or more sources to one or more domains via one or more communication channels.

In some embodiments, the mitigation policy may contain a mitigation policy timer. For example, if the mitigation policy timer has expired, then the mitigation may be reverted.

In some embodiments, the mitigation policy may divert traffic flowing through a given communication channel. For example, the mitigation policy may specify diverting non-malicious traffic to one or more communication channels. As another example, the mitigation policy may allow traffic for a certain timeframe before diverting all traffic to one or more communication channels. Diverted traffic may later be re-diverted back to the initial communication channel depending on the effectiveness of the mitigation policy.

According to various embodiments, a mitigation policy may be specific to one or more of: one or more domains, one or more traffic sources, and/or one or more network ingress paths. For example, a mitigation policy may block or redirect traffic via a particular network ingress path without necessarily being specific to a domain or a traffic source. As another example, a mitigation policy may block or redirect traffic from a traffic source to a domain without being specific to a particular network ingress path. Various combinations are possible.

Figure 8:
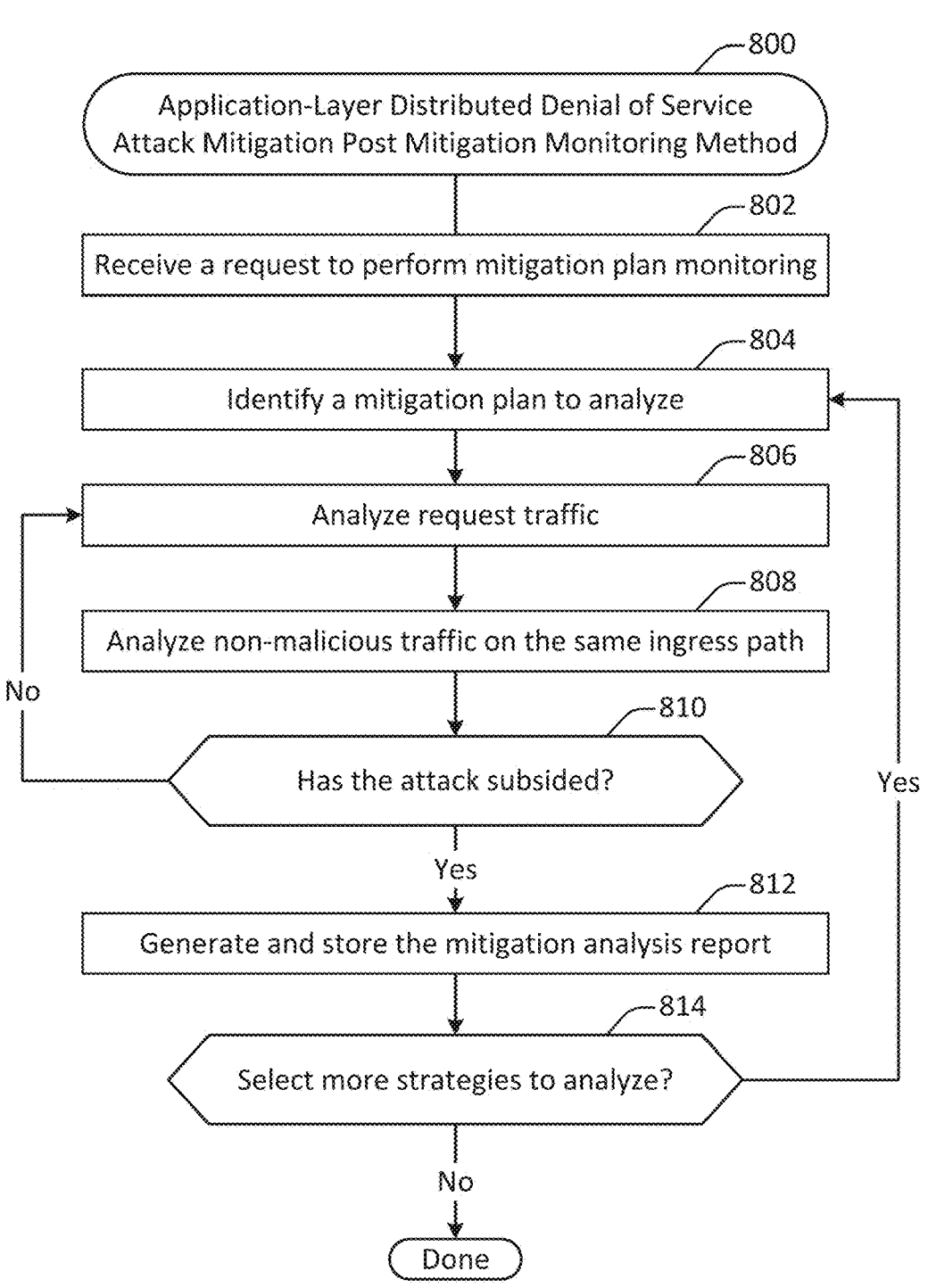
FIG. 8 illustrates a method of application-layer distributed denial of service attack mitigation post mitigation monitoring, performed in accordance with one or more embodiments.

FIG. 8 illustrates an application-layer distributed denial of service attack mitigation post mitigation monitoring method 800, performed in accordance with one or more embodiments. According to various embodiments, the DDoS attack mitigation analysis monitoring may involve analyzing the request traffic post DDoS policy enactment to evaluate the effectiveness of the mitigation policy on the given attack. The method 800 may be performed at the computing services environment 200 shown in FIG. 2, for instance at the orchestration engine 242.

A request to perform mitigation plan monitoring is received at 802. In some embodiments, the request may contain relevant information such as mitigation strategy, mitigation timeout timer, source, timestamps, endpoint domain, channel, client machine(s), and any other relevant information required to determine or monitor a mitigation policy for a DDoS attack. The request may be generated after the completion of the method 700 shown in FIG. 7.

A mitigation plan to analyze is identified at 804. The mitigation plan may be determined as discussed with respect to the method 700 shown in FIG. 7. In some embodiments, the efficacy of the mitigation strategy may be analyzed at any time after applying the mitigation plan. For example, a mitigation plan may be analyzed while its mitigation timer has not expired. As another example, the mitigation plan may be analyzed for comparison against other mitigation plans to determine an improved plan.

Request traffic is analyzed at 806. In some embodiments, the request traffic may be analyzed to determine the efficacy of the mitigation strategy. For example, the request traffic may be analyzed to determine if the overall traffic volume has changed since the mitigation plan was applied. As another example, the request traffic may be analyzed so to determine if traffic from particular sources to particular domains via particular communication channels has changed since the mitigation plan was implemented.

Non-malicious traffic on the same ingress path is analyzed at 808. In some embodiments, the non-malicious traffic may be monitored to validate that traffic from non-malicious sources continues to function as intended. As another example, non-malicious traffic may be monitored to verify that a mitigation strategy that involves diverting non-malicious traffic to a different ingress path is functioning as intended.

A determination is made at 810, as to whether the attack has subsided. In some embodiments, the determination is made by inspecting the traffic volume at one or more time ranges. For example, overall traffic volume may be compared with the DDoS traffic threshold. As another example, the amount of traffic originating from the source machines subject to the mitigation policy may be evaluated. For instance, determining if a DDoS attack has subsided may involve verifying that the traffic from the malicious client machines has decreased.

The mitigation analysis report may be generated and stored at 812. In some embodiments, generating the mitigation analysis report may involve operations such as comparing the results, storing the mitigation analysis, and/or generating a description of the results.

According to various embodiments, generating the mitigation analysis report may involve comparing the mitigation strategy against a simulation. For example, the mitigation strategy traffic volume may be compared to an expected traffic volume. As another example, the mitigation strategy traffic may be analyzed to determine the efficacy of the strategy in terms of time elapsed for attack mitigation.

Any relevant information generated by the analysis may be stored. In some embodiments, the mitigation analysis results may be stored to determine future mitigation strategies. For example, stored analysis may be used to determine a future mitigation strategy based on the effects the mitigation strategy had on the traffic. As another example, the stored analysis may be used to generate aggregate reports.

In some embodiments, a mitigation analysis report may be generated based on an interaction with a generative language model. For instance, a generative language model may be provided with information about an attack, a mitigation policy, and/or the performance of a mitigation policy in a prompt, along with one or more natural language instructions to generate a report based on the information. The generative language model may then complete the prompt with novel text that characterizes the information. Such text may then be stored and/or provided to one or more recipients. For instance, the report may be sent to an organization accessing computing services via the computing services environment and which may have been affected by the L7 DDoS attack.

A determination is made at 814, as to whether to select more strategies to analyze. In some embodiments, multiple strategies may be analyzed depending on the complexity of the DDoS attack. For example, given a complex DDoS attack from a variety of sources that continuously change, one or more mitigation policies may need to be applied that handle some or all of the affected DDoS attack traffic.

Dynamic WAF Control Overview and Architecture

FIG. 9 illustrates an overview method 900 for application-layer distributed denial of service attack mitigation configuration. According to various embodiments, an L7 DDoS attack can be mitigated by updating, via a cloud controller, a cloud-provided WAF configuration to filter out malicious traffic. Such a process may depend on the particular type of network architecture employed in an ingress route.

In some embodiments, the method 900 may be performed at one or more components of a computing services environment such as the computing services environment 200 shown in FIG. 2. For instance, the method 900 may be performed at least in part at the orchestration engine 242.

Network traffic indicating an L7 DDoS attack against one or more portions of a computing services environment is identified at 902. According to various embodiments, some DDoS attacks may target one or more components of a computing services environment. For example, a DDoS attack may simultaneously send malicious traffic to a login page and the support page. As another example, a DDoS attack may target a new endpoint by sending requests from a variety of entry points into the edge network. Additional details regarding the detection of malicious traffic are discussed with respect to FIG. 3, FIG. 4, and FIG. 6.

Configuration information is determined at 904 for the computing services environment. According to various embodiments, the computing services environment may contain one or more cloud provider solutions. For example, the computing services environment may contain a first party cloud provider for a subset of their endpoints, and a public cloud provider for a subset of their endpoints. As another example, the computing services environment may include a public cloud provider with a cloud-native WAF and an L7 WAF. As yet another example, the computing services environment may contain a first party cloud provider with an L7 WAF and an ingress/load balancer WAF, a public cloud provider with a cloud native WAF and an L7 WAF for the virtual environment. Additional details regarding various configurations of different components of a computing service environment with cloud providers are discussed with respect to FIG. 10.

One or more L7 DDoS attack mitigation configurations are activated at 906 based on the configuration information. According to various embodiments, one or more attack mitigation configurations may be activated based on one or more configurations and will remain active until the attack has been confirmed to have subsided. For example, the L7 DDoS attack mitigation configuration may include information about the WAF state, attack information, and/or an updated mitigation policy. Additional details regarding the activation of attack mitigation in a WAF are discussed with respect to the method 1200 shown in FIG. 12.

One or more L7 DDoS attack mitigation policies are deactivated at 908 based on configuration information. The L7 DDoS attack mitigation may be deactivated after determining the attack has subsided. In some embodiments, the deactivation request may be triggered depending on the volume of traffic. For example, the deactivation request may be triggered whenever the traffic volume for a given set of domains falls below the threshold. As another example, the deactivation request may be triggered whenever a change in rate of traffic for a given set of domains falls below a rate change threshold. Additional details regarding the deactivation of attack mitigation in a WAF are discussed with respect to the method 1300 shown in FIG. 13.

Figure 10:
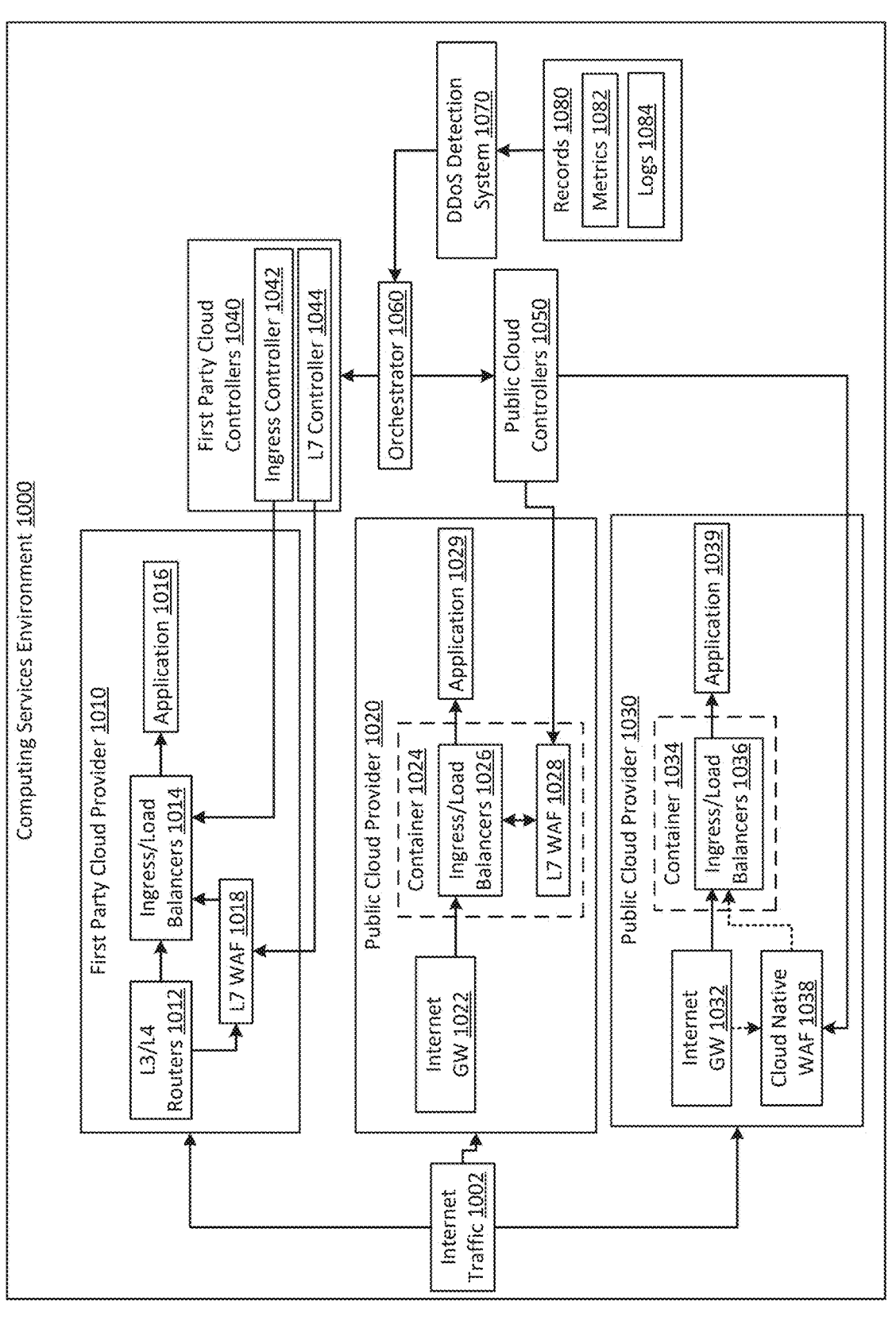
FIG. 10 illustrates one example of a computing services environment, configured in accordance with one or more embodiments.

FIG. 10 illustrates one example of a computing services environment 1000, configured in accordance with one or more embodiments. The example computing services environment 1000 may be part of, or entirely within, the computing services environment 200 shown in FIG. 2. The computing services environment 1000 may be configured so as to facilitate rapid and adaptive deployment of DDoS attack mitigation when an application layer DDoS attack is detected.

The computing services environment 1000 includes internet traffic 1002, a first party cloud provider 1010, public cloud provider (1020 and 1030), first party cloud controllers 1040, public cloud controllers 1050, orchestrator 1060, DDoS Detection System 1070, and records 1080. The first party cloud provider 1010 contains L3/L4 routers 1012, ingress/load balancers 1014, application 1016, and L7 WAF 1018. The public cloud provider 1020 contains an internet gateway 1022, a virtualization container 1024, ingress/load balancers 1026, L7 WAF 1028, Application 1029. The public cloud provider 1030 contains an internet gateway 1032, cloud native WAF 1034, a virtualization container 1034, internet gateway 1038, Application 1039. The first party cloud controllers 1040 contain an ingress controller 1052, and L7 controller 1054. The records 1080 contains metrics 1082 and logs 1084. Additional details regarding various elements that may be included in a computing services environment 1000 are discussed with respect to FIG. 2, FIG. 14, FIG. 15A, FIG. 15B, and FIG. 16.

According to various embodiments, the internet traffic 1002 includes traffic from one or more client machines to one or more end points contained in the applications 1016, 1029, and/or 1039. For example, an endpoint may involve accessing a particular website (e.g. acme.salesforce.com). Alternatively, or additionally, an application (1016, 1029, 1039) may include endpoints not directly accessible by one or more client machines from the internet. For example, an authentication service may ping another service to validate the user signing into a webpage. As another example, an endpoint may only be accessed when connected to a certain network (e.g. intranet). Additional details regarding endpoints are discussed with respect to element 230 of FIG. 2.

According to various embodiments, the orchestrator 1060, in connection with the DDoS detection system 1070, detects and mitigates application-layer DDoS attacks via communication to one or more services. For example, the orchestration engine may communicate with one or more services from the logging database, metrics database, historical records, and the mitigation policies to aid with the detection and mitigation of application-layer DDoS attacks. The orchestrator may then instruct one or more first party cloud controllers and/or one or more public cloud controllers 1050 to initiate DDoS attack mitigation.

In some embodiments the DDoS detection system 1070 may include one or more services running on one or more machines working to detect and mitigate application-layer DDoS attacks. For example, having a dedicated service to detect attacks, a dedicated service to mitigate the attack, and a separate service to generate reports. As another example, the training and/or deployment of an artificial intelligence model may be done in a separate service. As yet another example, the orchestration engine may send a web server a mitigation policy via one or more of the first party cloud controllers 1040 and/or the public cloud controllers 1050.

According to various embodiments, the records 1080 may contain any information required to detect and mitigate application-layer DDoS attacks. For example, historical information may be stored such as traffic spikes information, previous mitigation policies, mitigation policy success rate, and incident reports.

According to various embodiments, the metrics database 1082 may contain any metrics that aid with the detection and mitigation of application-layer DDoS attacks. For instance, the metrics database may include data reflecting measured performance at one or more elements in the computing services environment.

In some implementations, the logging database 1084 may store logging information from any element inside the computing services environment. For example, logs may contain relevant data such as client machine information, domain endpoints accessed, and duration of connection.

According to various embodiments, the first party cloud controllers 1040 may contain one or more ingress controllers 1042 and L7 controllers 1054 to reroute the traffic of one or more web servers in one or more networks. For example, the first party cloud controllers 1040 may update the firewall of a web server based on a mitigation policy. As another example, the first party cloud controllers 1040 may update one or more web server controllers to aid with the firewall protection depending on mitigation policies enacted by the orchestration engine. Additional details regarding the types of network traffic modifications made by the first party cloud controllers 1040 are discussed with respect to method 1200 in FIG. 12 and method 1300 in FIG. 13.

In some embodiments, the ingress controller 1052 may control the ingress network (ingress/load balancers 1014). For example, a mitigation policy may make amendments to one or more webservers in the ingress network. As another example, a mitigation policy may make amendments to the firewall of a web server in the ingress network to prevent certain traffic from accessing a particular endpoint.

In some embodiments, the L7 controller 1044 may control the L7 WAF 1018 and other computing elements inside the first party cloud provider 1010. For example, a mitigation policy may make amendments to route all the outgoing traffic of the L3/L4 Routers 1012 to the L7 WAF 1018 and the L7 WAF filtering out the malicious traffic when sending traffic requests to the ingress/load balancers 1014.

According to various embodiments, the first party cloud provider 1010 receives requests to access one or more domain endpoints from one or more client machines from across the internet. The first party cloud provider 1010 may be a software and hardware solution deployed by the service provider of the computing services environment 1000. For example, a first party cloud provider is Salesforce for services and users of the Salesforce system.

According to various embodiments, the ingress/load balancers 1014 may contain one or more servers that connect one more client machines with one or more applications 1016. The first party cloud provider 1010 may include one or more L3/L4 routers 1012 that receive, filter, and route the traffic to the ingress/load balancers 1014.

In some embodiments, by adjusting the configuration of the L3/L4 routers 1012, the L7WAF may be adaptively configured to process or not process the incoming traffic. For example, when an attack has not been detected, the ingress/load balancers 1014 may process traffic received from the L3/L4 routers 1012 irrespective of any operations performed by the L7 WAF 1018. However, when attack mitigation is in place, the ingress/load balancers 1014 may delay forwarding to the application 1016 until the traffic has been filtered by the L7 WAF 1018.

According to various embodiments, when deployed, the L7 WAF 1018 may be instructed to inspect traffic entering the ingress/load balancers 1014. For example, the L7 WAF may be instructed to filter out malicious traffic before it reaches the ingress/load balancers 1014. As another example, the L7 WAF may block certain client machines from accessing the application 1016.

According to various embodiments, the public cloud provider (1020 and 1030) receives one or more requests to access one or more domain endpoints from one or more client machines from across the internet. The public cloud provider (1020 and 1030) may be a software and/or hardware solution involving resources external to the service provider of the computing services environment 1000. For example, service provider such as Salesforce may employ hardware resources provided by a public cloud provider such as Amazon Web Services (AWS) to provide the computing services.

In some embodiments, a public cloud provider may provide a cloud hosting solution that the client may use to filter the traffic being received on their network. The public cloud provider may also host virtual containers that can host one or more applications (e.g., 1029, 1039).

According to various embodiments, the internet gateways (1022 and 1032) of a public cloud provider (1020 and 1030) receive, filter, and route traffic to other servers to handle the traffic. The ingress/load balancers (1026, 1036) may perform similar tasks to the internet gateways (1022 and 1032) but may forward the traffic to a virtual environment/container for further processing. Once processed, traffic may be routed to an application (1029, 1039), which may be hosted on a public cloud provider and may be running in a virtual container.

According to various embodiments, a virtualization container (1024 and 1034) in a public cloud (1020 and 1030) automates the deployment, scaling, and management of containerized applications. The virtual container may be provided as a solution from the same or different organization than the public cloud provider (1020 and 1030). For example, a container service may be a Kubernetes cluster such as the one provided by Amazon Elastic Kubernetes Service (EKS) running on AWS.

According to various embodiments, a public cloud provider may provide one or more WAF solutions and APIs to make modifications to the WAF. For example, a public cloud provider may provide a native WAF 1038. The cloud native WAF 1038 may reside in a deactivated state when an attack has not been detected. Then, when an attack is detected, the cloud native WAF 1038 may be activated and used for traffic filtering. Upon activation, traffic may be rerouted from the internet gateway 1032 to the cloud native WAF 1038 before being sent to the ingress/load balancers 1036. The configurations of an L7 WAF 1028 may be updated by an API provided by the public cloud provider.

In some embodiments, a public cloud provider may support a user-deployed L7 WAF 1028. For instance, the user-deployed L7 WAF 1038 may be deployed in a Kubernetes sidecar configuration. The L7 WAF 1028 receives traffic requests from the ingress/load balancers 1026. When an attack has not been detected, traffic may continue to be processed by the ingress/load balancers 1026 regardless of operations performed by the L7 WAF 1028. However, when attack mitigation is in place, the ingress/load balancers 1026 may instead be configured to delay sending traffic to the application 1029 until the L7 WAF 1028 transmits a response approving the traffic. In this way, the L7 WAF 1028 may selectively filter traffic for the ingress/load balancers 1026. The ingress/load balancers (1014, 1028, 1036) are alternatively referred to herein as application gateways.

According to various embodiments, the public cloud controllers 1050 may contain one or more public cloud controllers to update the configuration of a WAF in the public cloud. Updating the public cloud WAF is done by an API. For example, the network controllers may update the security of a web server based on a mitigation policy. As another example, the network controller may update one or more web server controllers to aid with the firewall protection depending on mitigation policies enacted by the orchestration engine. Additional details regarding the types of network traffic modifications made by the first party cloud controllers 1040 are discussed with respect to method 1200 in FIG. 12 and method 1300 in FIG. 13.

The computing services environment 1000 shown in FIG. 10 is an example provided for the purposes of illustration. For instance, the computing services environment 1000 includes one each of a first party cloud provider 1010, a public cloud provider 1030 with a cloud-native WAF, and a public cloud provider 1030 with a WAF configured as a Kubernetes sidecar. However, in practice a computing services environment may have various numbers and combinations of cloud providers, WAF configurations, network architectures, and the like.

It should be noted that in the example shown in FIG. 10, not all of the hardware components are under the control of a single service provider. For example, the service provider of the computing services environment 1000 may deploy processes and data to provide computing services via hardware provided by other cloud computing service providers. Such a configuration may be referred to herein as a "public cloud" architecture.

Dynamic WAF Control Management

Figure 11:
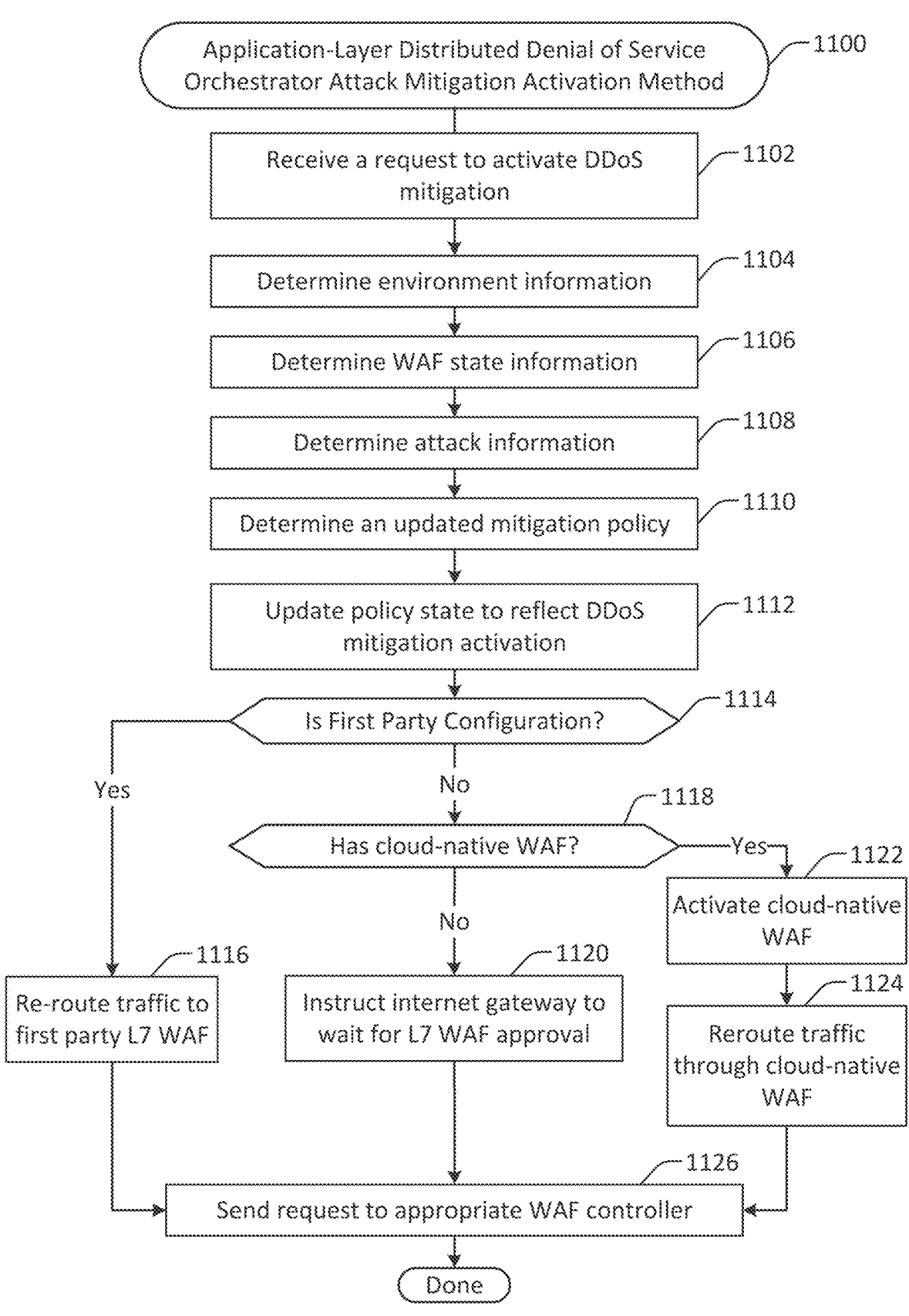
FIG. 11 illustrates a method of application-layer distributed denial of service orchestrator attack mitigation activation, performed in accordance with one or more embodiments.

FIG. 11 illustrates a method 1100 of application-layer distributed denial of service orchestrator attack mitigation activation, performed in accordance with one or more embodiments. The attack mitigation activation method may be performed to relevant information based on the computing services environment and the DDoS attack information. The information may then be used to update a policy state to communicate with the appropriate WAF to filter out the malicious traffic. The method 1100 may be performed at the orchestrator 1060 shown in FIG. 10.

A request to activate DDoS mitigation is received at 1102. According to various embodiments, the DDoS mitigation request may be sent by the DDoS Detection System 1070. For example, an alert is sent to the orchestrator by the DDoS Detection System to reflect a DDoS attack that has been identified. Additional details regarding the detection of a DDoS attack are discussed with respect to the method 500 shown in FIG. 5.

Computing services environment information is determined at 1104. According to various embodiments, the computing services environment may contain one or more cloud provider solutions. For example, a computing services environment may contain a first party cloud provider for one subset of endpoints and a public cloud provider for another subset of endpoints. As another example, the computing services environment may include a public cloud provider with a cloud-native WAF and an L7 WAF. As yet another example, the computing services environment may include a first party cloud provider with an L7 WAF and an ingress/load balancer WAF, and a public cloud provider with a cloud native WAF and an L7 WAF for the virtual environment. As discussed with respect to FIG. 10, various configurations are possible.

In some embodiments, a validation operation may be performed to verify the health of all the components of the computing services environment are as expected. For example, the orchestrator may verify it can communicate with the cloud controllers and their respective WAFs. As another example, the orchestrator may authorize the cloud controllers to communicate with the respective WAFs.

WAF state information is determined at 1106. According to various embodiments, the orchestrator may gather the WAF state information. For example, the orchestrator may communicate with the cloud controllers to gather the type of state the WAF is currently in based on prior policies. The orchestrator may update any default values based on the WAF state. If indicated, the orchestrator may communicate with the cloud controllers to reboot the respective WAF.

Attack information is determined at 1108. According to various embodiments, the attack information may be gathered by one or more resources. For example, the attack information may be passed in as part of the request to activate the DDoS mitigation. As another example, the orchestrator may communicate with the DDoS Detection System to gather attack information.

An updated mitigation policy is determined at 1110. According to various embodiments, the mitigation policy is determined based on the L7 DDoS attack. For example, updating the L7 WAF to filter out malicious traffic being sent by a particular machine for a period of time. As another example, the mitigation policy may be updated to limit the traffic being sent to a particular endpoint for a period of time. As yet another example, the mitigation policy may throttle the traffic of a public cloud native WAF to filter out malicious traffic from being sent to a virtual container. Additional details regarding the determination for the mitigation policy are discussed with respect to the method 700 shown in FIG. 7 as well as the method 1000 shown in FIG. 10.

The policy state is updated at 1112 to reflect DDoS mitigation activation. In some embodiments, one or more validation operations may be. For example, a determination may be made as to whether the local and remote versions of the policy are the same. Differences in policies may be resolved by, for instance, a pull request.

A determination is made at 1114 as to whether the DDoS attack in question is related to the computing services environment configured in a first party cloud provider configuration. According to various embodiments, the determination may be made by using the information gathered as discussed with respect to the operations 1102 through 1108.

Upon determining that a first party configuration is implicated, then network traffic is rerouted at 1116 to the first party L7 WAF. In some embodiments, the L7 WAF may begin to filter out traffic that meets the malicious traffic criteria.

Upon determining that a first party configuration is not implicated, then at 1118 a determination is made as to whether the computing services environment is configured with a public cloud-native WAF configuration. In some embodiments, the public cloud provider may host the cloud-native and L7 WAF for the virtual container.

Upon determining that a cloud-native WAF is available, the cloud-native WAF is activated at 1122. According to various embodiments, activating the cloud-native WAF may involve any of one or more operations. For example, before any traffic is rerouted through the cloud-native WAF to filter out malicious traffic, the cloud-native WAF may first be activated. Additionally, any competing L7 WAF may be disabled.

After the cloud-native WAF is activated, the traffic is rerouted through the cloud-native WAF at 1124. According to various embodiments, the public cloud-native WAF will filter out traffic before it reaches the virtual container. The traffic filtering may be defined based on the attack mitigation policy.

Upon determining instead that a cloud-native WAF is not available, then the internet gateway is instructed at 1120. According to various embodiments, the instruction set may include an indication to wait for L7 WAF approval. For example, the internet gateway 1024 may route traffic to the L7 WAF 1028. When attack mitigation is in place, the internet gateway 1024 may then wait for approval from the L7 WAF 1028 before forwarding traffic to the application 1029. In contrast, when attack mitigation is not in place, the L7 WAF 1028 may operate in a "listen" only mode, where the L7 WAF is receiving traffic, the ingress/load balancers 1026 do not wait for WAF approval before processing and forwarding the traffic.

The instructions are sent to the appropriate WAF controller at 1126. According to various embodiments, the WAF controller may contact the WAF via an appropriate application procedure interface. For example, when contacting the WAF on a public cloud provider, the WAF controller may send the instructions to the WAF via the public cloud provider's API.

Figure 12:
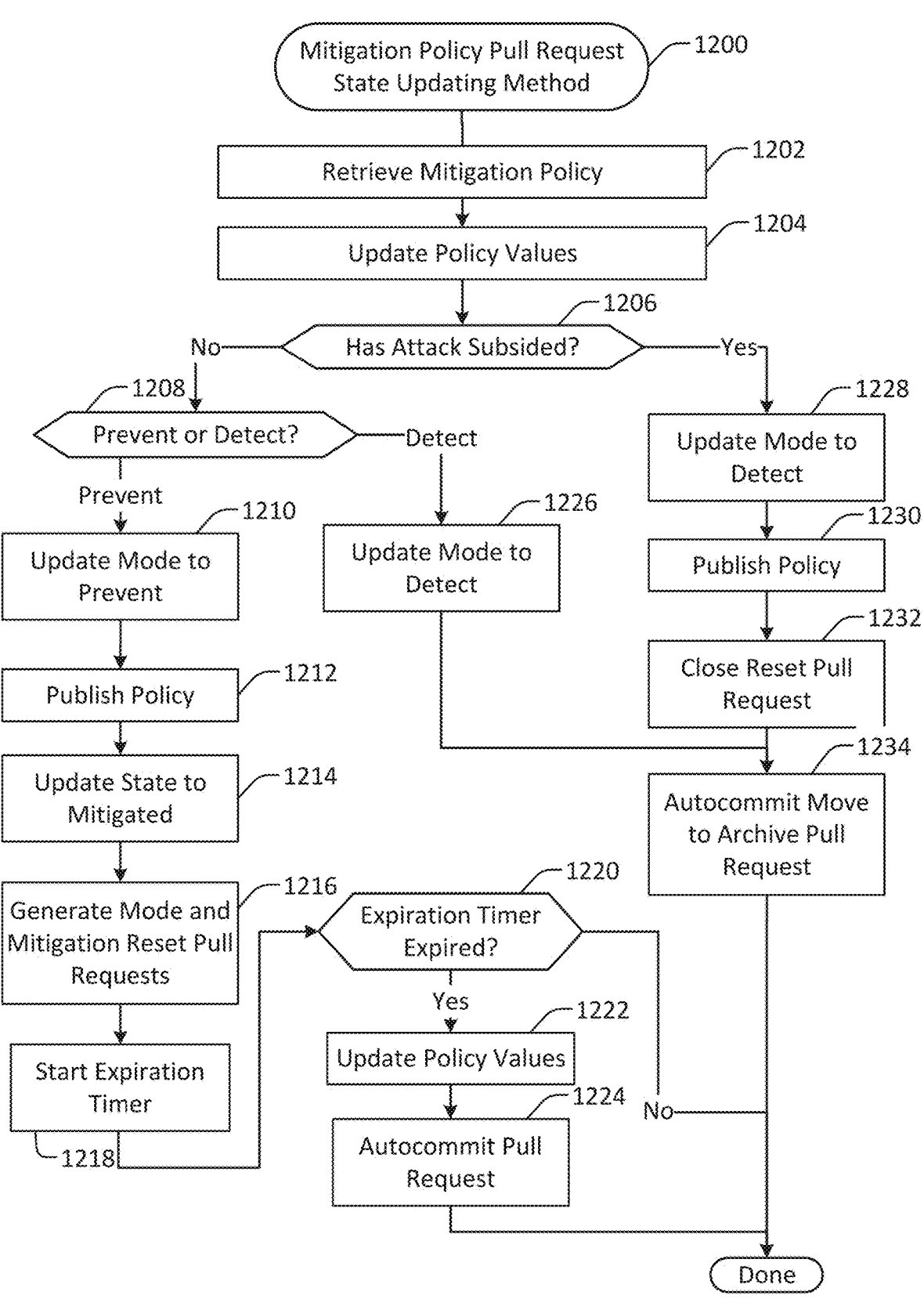
FIG. 12 illustrates a method of application-layer distributed denial of service mitigation policy state updating, performed in accordance with one or more embodiments.

FIG. 12 illustrates a method 1200 of application-layer distributed denial of service mitigation policy merge request state updating, performed in accordance with one or more embodiments. The application-layer DDoS policy that is updated by the method 1200 may then be used to control the operation of various components of a computing services environment. For instance, the policy may be used to control one or more web application firewall configurations as shown in FIG. 10. The method 1200 may be performed to implement a policy change such as a policy change described with respect to FIG. 11 or FIG. 13.

In some embodiments, policy may be stored and updated in a version control system. For instance, the method 1200 is described as including "pull requests", which provide for updating information in a version control system such as GitHub, GitLab, Bitbucket, Azure Repos, and AWS Code-Commit. However, the terms "pull request" and "merge request" may be used exchangeable depending on the type and version of the remote versioning system being used. Examples of remote version control systems include. More-over, techniques and mechanisms described herein do not require a version control system, and indeed may function in a system configured in a different way.

The mitigation policy is retrieved at 1202. According to various embodiments, the retrieval process may involve communicating with a remote repository. For example, the mitigation policy can be retrieved to a local environment by initiating a pull request from a remote repository.

The policy values are updated at 1204. According to various embodiments, the policy values may be updated. For example, the local version of the policy may reflect information communicating the policy may be outdated. As another example, the local version of the policy may reflect information communicating a unique key.

A determination is made at 1206 as to whether the attack has subsided. The L7 DDoS attack may be classified as subsided for one or more reasons. In some embodiments, the deactivation request may be triggered depending on the volume of traffic. For example, the deactivation request may be triggered whenever the traffic volume for a given set of domains falls below the threshold. As another example, the deactivation request may be triggered whenever a change in rate of traffic for a given set of domains falls below a rate change threshold. Additional details regarding the deactivation of attack mitigation in a WAF are discussed with respect to the method 1300 shown in FIG. 13.

A determination is made at 1208 as to whether to prevent or detect an L7 DDoS attack. In some embodiments, the determination may be made as discussed with respect to the method 1100 shown in FIG. 11.

The policy is updated at 1210 to reflect a prevent mode. For example, a field associated with the WAF mode may be updated to a value associated with the prevent mode.

The policy is then published at 1212, and the state is updated at 1214 to mitigated. Publishing the policy may bring the remote version of the policy in line with the local version of the policy.

Mode and mitigation reset pull requests are generated at 1216. In some embodiments, the mode and mitigation reset pull requests may update the remote state for the purpose of updating the configurations at the cloud providers, as discussed with respect to FIG. 10.

An expiration timer is started at 1218. In some embodiments, the expiration timer may be set to enforce a maximum time for keeping in place the mitigation state as determined by the prevent mode policy.

A determination is made at 1220, as whether or not the expiration timer has expired. Upon determining that the expiration timer has expired, then one or more policy values are updated at 1222 to reflect the expiration, and the merge request is auto committed at 1224 to publish the policy values.

Upon determining the mode is set to detect an L7 DDoS attack from 1208, the mode of the policy is updated to reflect the detection mode at 1226. After updating the mode, the pull request may auto commit move to archive the pull request.

Upon determining the attack has subsided in 1206, the policy is updated at 1228 to reflect detection mode. For example, a mode field may be updated to store a value associated with detection mode.

The policy is published at 1230. According to various embodiments, publishing the policy may involve one or more steps in the remote versioning system. For example, a local branch of the versioning system may be moved to the remote branch to reflect the changes.

The merge request is closed at 1232. According to various embodiments, closing the merge request may be done automatically after merging the local and remote branches. For example, automatically deleting branches after merging using GitHub Actions.

The merge request is archived at 1234. For example, an auto-commit feature may be used to move the pull request to an archive.

Figure 13:
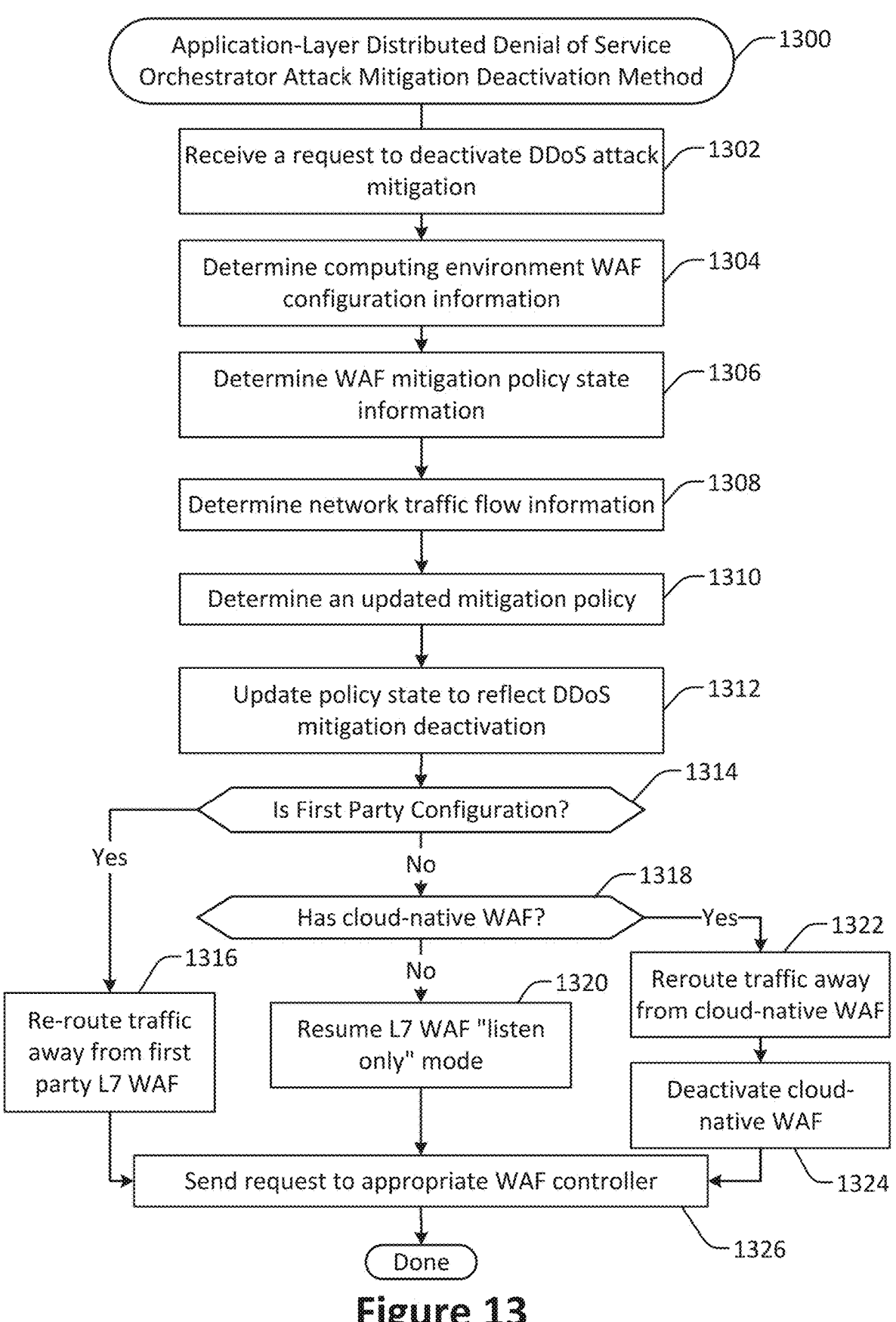
FIG. 13 illustrates a method of application-layer distributed denial of service orchestrator attack mitigation deactivation, performed in accordance with one or more embodiments.

FIG. 13 illustrates a method 1300 of application-layer distributed denial of service orchestrator attack mitigation deactivation. According to various embodiments, the attack mitigation deactivation method initially gathers relevant information, based on the computing services environment and the DDoS attack information, to communicate with the appropriate WAF to stop filtering out traffic.

A request to deactivate DDoS mitigation is received at 1302. According to various embodiments, the DDoS mitigation request may be sent by the DDoS Detection System. For example, an alert is sent to the orchestrator by the DDoS Detection System to reflect a DDoS attack has subsided. Additional details regarding the detection of a DDoS attack are discussed with respect to the method 500 shown in FIG. 5.

Computing services environment information is determined at 1304. The determination of the computing services environment information at 1304 may be substantially similar to the determination of such information at 1104.

WAF mitigation policy state information is determined at 1306. According to various embodiments, the orchestrator may identify the mitigation policy that was active during attack mitigation period, for instance by accessing the version control system and/or one or more cloud controllers to gather the type of state the WAF is currently in based on prior policies. As another example, the orchestrator may update any default values based on the WAF state. As yet another example, the orchestrator may communicate with the cloud controllers to reboot the respective WAF.

Network traffic flow information is determined at 1308. According to various embodiments, network traffic flow may include previously determined malicious traffic. The attack information may be gathered by one or more resources. For example, the attack information may be passed in as part of the request to deactivate the DDoS mitigation. As another example, the orchestrator may need to communicate with the DDoS Detection System to gather attack information. Additional details regarding the information collected to identify whether an attack is occurring or has been mitigated are discussed with respect to FIG. 3.

An updated mitigation policy is determined at 1310. According to various embodiments, the mitigation policy is determined based on the L7 DDoS attack information. For example, the L7 WAF may be updated to filter out traffic being sent by a particular machine for a period of time. As another example, the mitigation policy may be updated to stop limiting the traffic being sent to a particular endpoint for a period of time. As yet another example, the mitigation policy may stop throttling the traffic of a public cloud native WAF to filter out traffic from being sent to a virtual container.

The policy state is updated at 1312 to reflect DDoS mitigation deactivation. In some embodiments, validation operations may be performed to verify all versions of the policy are the same. For example, updating the policy and verifying the local and remote versions of the policy are the same. Additional details regarding policy state updates are discussed with respect to the method 1100 shown in FIG. 11.

A determination is made at 1314 as to whether the DDoS attack in question is related to the computing services environment configured in a first party cloud provider configuration. According to various embodiments, the determination may be made by using the information determined as discussed with respect to the operations 1302-1312.

Upon determining that a first party configuration is implicated, network traffic routed away from the first party L7 WAF at 1316. In some embodiments, the traffic may be redirected to travel directly from the L3/L4 routers 1012 to the ingress/load balancers 1014. In this way, the L7 WAF 1018 may be configured to no longer filter the traffic.

Upon determining instead that a first party configuration is not implicated, a determination is made at 1318 as to whether the computing services environment is configured with a public cloud-native WAF configuration. The determination may be made based on the configuration, policy, and state information determined as discussed with respect to the operations 1302-1312.

Upon determining that a cloud-native WAF is being employed, traffic is rerouted away from the cloud-native WAF at 1322. For instance, traffic may be rerouted from the internet gateway 1032 directly to the ingress/load balancers 1036, bypassing the cloud native WAV 1038.

The cloud-native WAF subscription is deactivated at 1324. According to various embodiments, deactivating the cloud-native WAF subscription may involve operations such as transmitting an instruction via an application procedure interface provided by the public cloud provider.

Upon determining instead that a cloud-native WAF has not been employed, the internet gateway is placed back in listen-only mode at 1320. According to various embodiments, the default phase can be considered a "listen" only, where the L7 WAF is receiving traffic, but is not authorized to filter any traffic to the endpoint.

Figure 14:
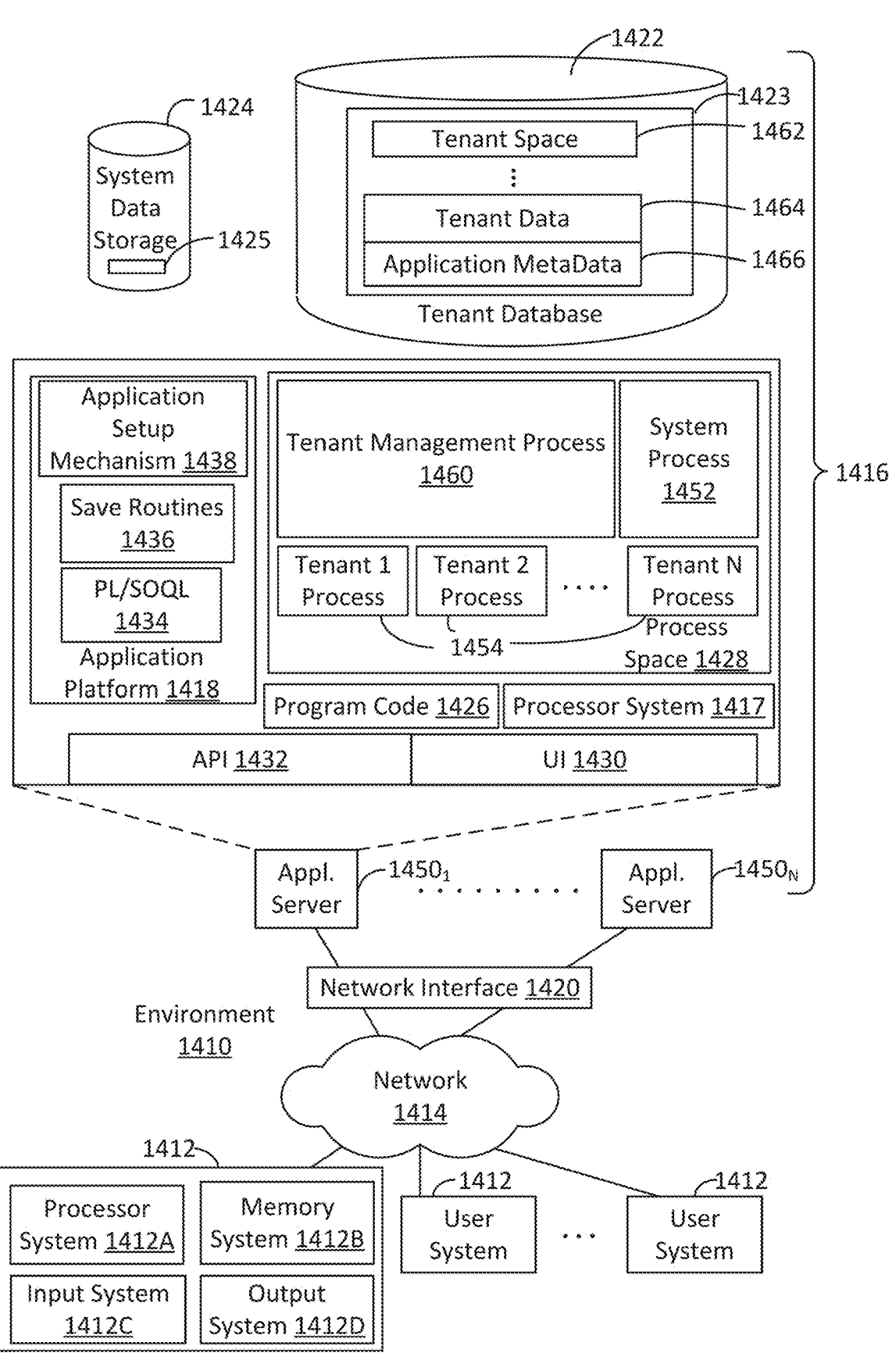
FIG. 14 shows a block diagram of an example of an environment that includes an on-demand database service configured in accordance with some implementations.

The instructions are sent to the appropriate WAF controller at 1334. According to various embodiments, the WAF controller may contact the WAF and/or other suitable components via an API. For example, when contacting the WAF on a public cloud provider, the WAF controller may send the instructions to the WAF via the public cloud provider's API. Computing Services Environment Architecture and Operation FIG. 14 shows a block diagram of an example of an environment 1410 that includes an on-demand database service configured in accordance with some implementations. Environment 1410 may include user systems 1412, network 1414, database system 1416, processor system 1417, application platform 1418, network interface 1420, tenant data storage 1422, tenant data 1423, system data storage 1424, system data 1425, program code 1426, process space 1428, User Interface (UI) 1430, Application Program Interface (API) 1432, PL/SOQL 1434, save routines 1436, application setup mechanism 1438, application servers 1450-1 through 1450-N, system process space 1452, tenant process spaces 1454, tenant management process space

1460, tenant storage space 1462, user storage 1464, and application metadata 1466. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1416, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1418 may be a framework that allows the creation, management, and execution of applications in system 1416. Such applications may be developed by the database service provider or by users or third-party application developers accessing the service. Application platform 1418 includes an application setup mechanism 1438 that supports application developers' creation and management of applications, which may be saved as metadata into tenant data storage 1422 by save routines 1436 for execution by subscribers as one or more tenant process spaces 1454 managed by tenant management process 1460 for example. Invocations to such applications may be coded using PL/SOQL 1434 that provides a programming language style interface extension to API 1432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1466 for a subscriber making such an invocation. Such system processes may also manage execution of application metadata 1466 as an application in a virtual machine.

In some implementations, each application server 1450 may handle requests for any user associated with any organization. A load balancing function (e.g., an F5 Big-IP load balancer) may distribute requests to the application servers 1450 based on an algorithm such as least-connections, round robin, observed response time, etc. Each application server 1450 may be configured to communicate with tenant data storage 1422 and the tenant data 1423 therein, and system data storage 1424 and the system data 1425 therein to serve requests of user systems 1412. The tenant data 1423 may be divided into individual tenant storage spaces 1462, which can be either a physical arrangement and/or a logical arrangement of data. Within each tenant storage space 1462, user storage 1464 and application metadata 1466 may be similarly allocated for each user. For example, a copy of a user's most recently used (MRU) items might be stored to user storage 1464. Similarly, a copy of MRU items for an entire tenant organization may be stored to tenant storage space 1462. A UI 1430 provides a user interface and an API 1432 provides an application programming interface to system 1416 resident processes to users and/or developers at user systems 1412.

System 1416 may implement a web-based attack detection and mitigation system. For example, in some implementations, system 1416 may include application servers configured to implement and execute software applications for detecting and mitigating distributed denial of service attacks. The application servers may be configured to provide related data, code, forms, web pages and other information to and from user systems 1412. Additionally, the application servers may be configured to store information to, and retrieve information from a database system. Such information may include related data, objects, and/or Webpage content. With a multi-tenant system, data for multiple tenants may be stored in the same physical database object in tenant data storage 1422, however, tenant data may be arranged in the storage medium(s) of tenant data storage 1422 so that data of one tenant is kept logically separate from that of other tenants. In such a scheme, one tenant may not access another tenant's data, unless such data is expressly shared.

Several elements in the system shown in FIG. 14 include conventional, well-known elements that are explained only briefly here. For example, user system 1412 may include processor system 1412A, memory system 1412B, input system 1412C, and output system 1412D. A user system 1412 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1412 to access, process and view information, pages and applications available from system 1416 over network 1414. Network 1414 may be any network or combination of networks of devices that communicate with one another, such as any one or any combination of a LAN (local area network), WAN (wide area network), wireless network, or other appropriate configuration.

The users of user systems 1412 may differ in their respective capacities, and the capacity of a particular user system 1412 to access information may be determined at least in part by "permissions" of the particular user system 1412. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 1416. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1416 may provide on-demand database service to user systems 1412 using an MTS arrangement. By way of example, one tenant organization may be a company that employs a sales force where each salesperson uses system 1416 to manage their sales process. Thus, a user in such an organization may maintain contact data, leads data, customer follow-up data, performance data, goals and progress data, etc., all applicable to that user's personal sales process (e.g., in tenant data storage 1422). In this arrangement, a user may manage his or her sales efforts and cycles from a variety of devices, since relevant data and applications to interact with (e.g., access, view, modify, report, transmit, calculate, etc.) such data may be maintained and accessed by any user system 1412 having network access.

When implemented in an MTS arrangement, system 1416 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1416 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1416 may also maintain system-level data usable by multiple tenants or other data. Such system-level data may include industry reports, news, postings, and the like that are sharable between tenant organizations.

In some implementations, user systems 1412 may be client systems communicating with application servers 1450 to request and update system-level and tenant-level data from system 1416. By way of example, user systems 1412 may send one or more queries requesting data of a database maintained in tenant data storage 1422 and/or system data storage 1424. An application server 1450 of system 1416 may automatically generate one or more SQL statements (e.g., one or more SQL queries) that are designed to access the requested data. System data storage 1424 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 15A, 15B:
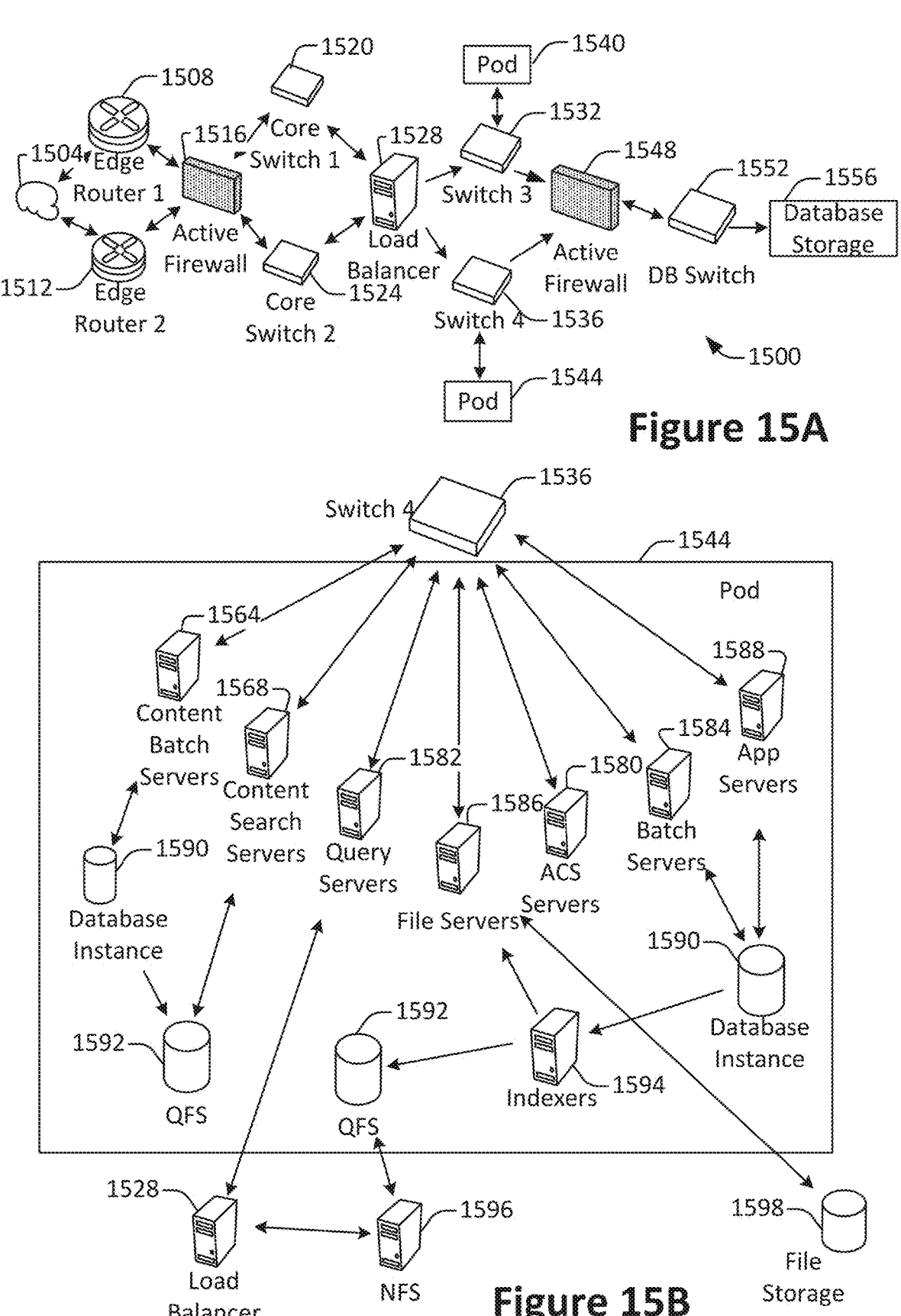
FIG. 15A shows a system diagram of an example of architectural components of an on-demand database service environment, configured in accordance with some implementations.
FIG. 15B shows a system diagram further illustrating an example of architectural components of an on-demand database service environment, in accordance with some implementations.

FIG. 15A shows a system diagram of an example of architectural components of an on-demand database service environment 1500, configured in accordance with some implementations. A client machine located in the cloud 1504 may communicate with the on-demand database service environment via one or more edge routers 1508 and 1512. A client machine may include any of the examples of user systems 1412 described above. The edge routers 1508 and 1512 may communicate with one or more core switches 1520 and 1524 via firewall 1516. The core switches may communicate with a load balancer 1528, which may distribute server load over different pods, such as the pods 1540 and 1544 by communication via pod switches 1532 and 1536. The pods 1540 and 1544, which may each include one or more servers and/or other computing resources, may perform data processing and other operations used to provide on-demand services. Components of the environment may communicate with a database storage 1556 via a database firewall 1548 and a database switch 1552.

Accessing an on-demand database service environment may involve communications transmitted among a variety of different components. The environment 1500 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 15A and 15B.

The cloud 1504 refers to any suitable data network or combination of data networks, which may include the Internet. Client machines located in the cloud 1504 may communicate with the on-demand database service environment 1500 to access services provided by the on-demand database service environment 1500. By way of example, client machines may access the on-demand database service environment 1500 to retrieve, store, edit, and/or process distributed denial of service attack and mitigation information.

In some implementations, the edge routers 1508 and 1512 route packets between the cloud 1504 and other components of the on-demand database service environment 1500. The edge routers 1508 and 1512 may employ the Border Gateway Protocol (BGP). The edge routers 1508 and 1512 may maintain a table of IP networks or 'prefixes', which designate network reachability among autonomous systems on the internet.

In one or more implementations, the firewall 1516 may protect the inner components of the environment 1500 from internet traffic. The firewall 1516 may block, permit, or deny access to the inner components of the on-demand database service environment 1500 based upon a set of rules and/or other criteria. The firewall 1516 may act as one or more of a packet filter, an application gateway, a stateful filter, a proxy server, or any other type of firewall.

In some implementations, the core switches 1520 and 1524 may be high-capacity switches that transfer packets within the environment 1500. The core switches 1520 and 1524 may be configured as network bridges that quickly route data between different components within the on-demand database service environment. The use of two or more core switches 1520 and 1524 may provide redundancy and/or reduced latency.

In some implementations, communication between the pods 1540 and 1544 may be conducted via the pod switches 1532 and 1536. The pod switches 1532 and 1536 may facilitate communication between the pods 1540 and 1544 and client machines, for example via core switches 1520 and 1524. Also or alternatively, the pod switches 1532 and 1536 may facilitate communication between the pods 1540 and 1544 and the database storage 1556. The load balancer 1528 may distribute workload between the pods, which may assist in improving the use of resources, increasing throughput, reducing response times, and/or reducing overhead. The load balancer 1528 may include multilayer switches to analyze and forward traffic.

In some implementations, access to the database storage 1556 may be guarded by a database firewall 1548, which may act as a computer application firewall operating at the database application layer of a protocol stack. The database firewall 1548 may protect the database storage 1556 from application attacks such as structure query language (SQL) injection, database rootkits, and unauthorized information disclosure. The database firewall 1548 may include a host using one or more forms of reverse proxy services to proxy traffic before passing it to a gateway router and/or may inspect the contents of database traffic and block certain content or database requests. The database firewall 1548 may work on the SQL application level atop the TCP/IP stack, managing applications' connection to the database or SQL management interfaces as well as intercepting and enforcing packets traveling to or from a database network or application interface.

In some implementations, the database storage 1556 may be an on-demand database system shared by many different organizations. The on-demand database service may employ a single-tenant approach, a multi-tenant approach, a virtualized approach, or any other type of database approach. Communication with the database storage 1556 may be conducted via the database switch 1552. The database storage 1556 may include various software components for handling database queries. Accordingly, the database switch 1552 may direct database queries transmitted by other components of the environment (e.g., the pods 1540 and 1544) to the correct components within the database storage 1556.

FIG. 15B shows a system diagram further illustrating an example of architectural components of an on-demand database service environment, in accordance with some implementations. The pod 1544 may be used to render services to user(s) of the on-demand database service environment 1500. The pod 1544 may include one or more content batch servers 1564, content search servers 1568, query servers 1582, file servers 1586, access control system (ACS) servers 1580, batch servers 1584, and app servers 1588. Also, the pod 1544 may include database instances 1590, quick file systems (QFS) 1592, and indexers 1594. Some or all communication between the servers in the pod 1544 may be transmitted via the switch 1536.

In some implementations, the app servers 1588 may include a framework dedicated to the execution of procedures (e.g., programs, routines, scripts) for supporting the construction of applications provided by the on-demand database service environment 1500 via the pod 1544. One or more instances of the app server 1588 may be configured to execute all or a portion of the operations of the services described herein.

In some implementations, as discussed above, the pod 1544 may include one or more database instances 1590. A database instance 1590 may be configured as an MTS in which different organizations share access to the same database, using the techniques described above. Database information may be transmitted to the indexer 1594, which may provide an index of information available in the database 1590 to file servers 1586. The QFS 1592 or other suitable filesystem may serve as a rapid-access file system for storing and accessing information available within the pod 1544. The QFS 1592 may support volume management capabilities, allowing many disks to be grouped together into a file system. The QFS 1592 may communicate with the database instances 1590, content search servers 1568 and/or indexers 1594 to identify, retrieve, move, and/or update data stored in the network file systems (NFS) 1596 and/or other storage systems.

In some implementations, one or more query servers 1582 may communicate with the NFS 1596 to retrieve and/or update information stored outside of the pod 1544. The NFS 1596 may allow servers located in the pod 1544 to access information over a network in a manner similar to how local storage is accessed. Queries from the query servers 1522 may be transmitted to the NFS 1596 via the load balancer 1528, which may distribute resource requests over various resources available in the on-demand database service environment 1500. The NFS 1596 may also communicate with the QFS 1592 to update the information stored on the NFS 1596 and/or to provide information to the QFS 1592 for use by servers located within the pod 1544.

In some implementations, the content batch servers 1564 may handle requests internal to the pod 1544. These requests may be long-running and/or not tied to a particular customer, such as requests related to log mining, cleanup work, and maintenance tasks. The content search servers 1568 may provide query and indexer functions such as functions allowing users to search through content stored in the on-demand database service environment 1500. The file servers 1586 may manage requests for information stored in the file storage 1598, which may store information such as documents, images, basic large objects (BLOBs), etc. The query servers 1582 may be used to retrieve information from one or more file systems. For example, the query system 1582 may receive requests for information from the app servers 1588 and then transmit information queries to the NFS 1596 located outside the pod 1544. The ACS servers 1580 may control access to data, hardware resources, or software resources called upon to render services provided by the pod 1544. The batch servers 1584 may process batch jobs, which are used to run tasks at specified times. Thus, the batch servers 1584 may transmit instructions to other servers, such as the app servers 1588, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 16:
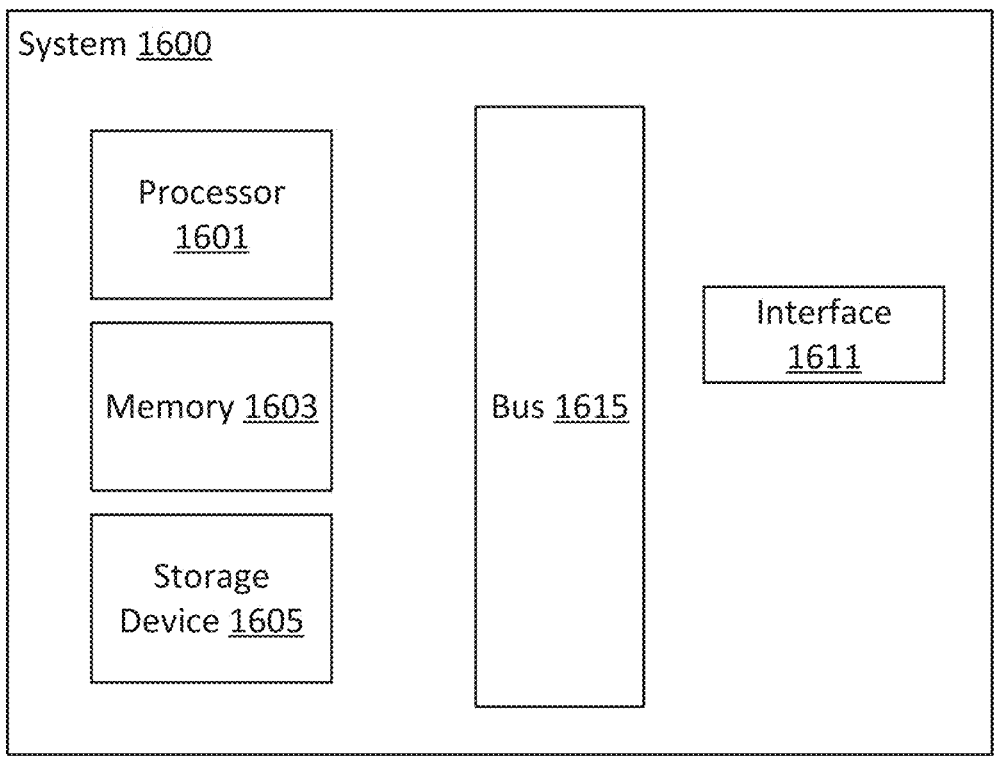
FIG. 16 illustrates one example of a computing device, configured in accordance with one or more embodiments.

FIG. 16 illustrates one example of a computing device. According to various embodiments, a system 1600 suitable for implementing embodiments described herein includes a processor 1601, a memory module 1603, a storage device 1605, an interface 1611, and a bus 1615 (e.g., a PCI bus or other interconnection fabric.) System 1600 may operate as variety of devices such as an application server, a database server, or any other device or service described herein. Although a particular configuration is described, a variety of alternative configurations are possible. The processor 1601 may perform operations such as those described herein. Instructions for performing such operations may be embodied in the memory 1603, on one or more non-transitory computer readable media, or on some other storage device. Various specially configured devices can also be used in place of or in addition to the processor 1601. The interface 1611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of application-level distributed denial of service attacks. However, the techniques disclosed herein apply to a wide variety of malicious network activity. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing services environment providing computing services by a service provider to a plurality of recipients via the Internet, the computing services environment comprising:

a plurality of application gateways receiving a plurality of application-layer request messages from a plurality of sources;

an orchestration engine including one or more processors configured to determine a plurality of mitigation policies corresponding with the plurality of application gateways based on a classification of a subset of the plurality of application-layer request messages as being sent from a subset of sources associated with a distributed denial of service attack; and a plurality of application-layer web application firewalls corresponding to the plurality of application gateways and being configured to transition from a deactivated state to an activated state upon receipt of an instruction from the orchestration engine, the plurality of application-layer web application firewalls in an activated state implementing the mitigation policies to prevent a subset of subsequent application-layer request messages from the subset of sources from reaching one or more components of the computing services environment, an application-layer web application firewall of the plurality of application-layer web application firewalls being configured as a container sidecar in a virtual container environment and residing in a cloud computing infrastructure hosted by a public cloud provider other than the service provider, wherein transitioning the application-layer web application firewall from a deactivated state to an activated state comprises transmitting a configuration instruction to a container ingress/load balancer to delay routing of traffic to a network endpoint until the container sidecar filters the traffic.

2. The computing services environment recited in claim 1, wherein the application-layer web application firewall is native to the cloud computing infrastructure, and wherein transitioning the application-layer web application firewall from a deactivated state to an activated state comprises transmitting an activation instruction to activate the application-layer web application firewall.

3. The computing services environment recited in claim 2, wherein transitioning the application-layer web application firewall from a deactivated state to an activated state further comprises transmitting a traffic rerouting instruction to reroute traffic to the application-layer web application firewall.

4. The computing services environment recited in claim 1, wherein the computing services environment is provided by the service provider, and wherein the application-layer web application firewall is hosted by the service provider, and wherein the application-layer web application firewall is configured to transition to an activated state upon receipt of an instruction from an application-layer controller.

5. The computing services environment recited in claim 1, wherein the plurality of mitigation policies are accessed and modified by a version control system or an application procedure interface.

6. The computing services environment recited in claim 1, wherein the orchestration engine selects a mitigation policy of the plurality of mitigation policies based on historical data indicating effectiveness of the mitigation policy at mitigating one or more previous distributed denial of service attacks.

7. The computing services environment recited in claim 1, wherein the plurality of mitigation policies includes a timeout indicating a point in time at which to revert a mitigation policy of the plurality of mitigation policies to a previous state.

8. The computing services environment as recited in claim 1, wherein the plurality of application-layer web application firewalls are arranged in a plurality of different cloud computing architectures, wherein the orchestration engine is further configured to transmit control signals to the plurality of web application firewalls via one or more network controllers, wherein the control signals are dependent upon the cloud computing architectures.

9. The computing services environment as recited in claim 5, wherein the application-layer web application firewall of the plurality of web application firewalls are configured to operate in a listen-only mode by default, and wherein transitioning the application-layer web application firewall from a deactivated state to an activated state comprises transitioning the application-layer web application firewall to a mitigation mode that includes traffic filtering.

10. The computing services environment as recited in claim 1, wherein the orchestration engine is configured to transmit one or more deactivation instructions to transition the plurality of application-layer web application firewalls from an activated state to a deactivated state upon making a determination that the distributed denial of service attack has subsided.

11. The computing services environment recited in claim 1, where a first source of the subset of sources is identified as being associated with the distributed denial of service attack based on application-layer activity, network layer activity, or transport layer activity.

12. The computing services environment recited in claim 11, wherein the plurality of mitigation policies includes a network layer rule or a transport layer rule preventing a subsequent application-layer request message from the first source from reaching the one or more components of the computing services environment.

13. A method implemented at an orchestration engine in a computing services environment providing computing services by a service provider to a plurality of recipients via the Internet, the method comprising:

receiving a plurality of application-layer request messages from a plurality of sources at a plurality of application gateways;

determining a plurality of mitigation policies at an orchestration engine including one or more processors, the plurality of mitigation policies corresponding with the plurality of application gateways based on a classification of a subset of the plurality of application-layer request messages as being sent from a subset of sources associated with a distributed denial of service attack; and transmitting an instruction from the orchestration engine to one or more of a plurality of application-layer web application firewalls corresponding to the plurality of application gateways and being configured to transition from a deactivated state to an activated state upon receipt of the instruction from the orchestration engine, the plurality of application-layer web application firewalls in an activated state implementing the mitigation policies to prevent a subset of subsequent application-layer request messages from the subset of sources from reaching one or more components of the computing services environment, an application-layer web application firewall of the plurality of application-layer web application firewalls being configured as a container sidecar in a virtual container environment and residing in a cloud computing infrastructure hosted by a public cloud provider other than the service provider, wherein transitioning the application-layer web application firewall from a deactivated state to an activated state comprises transmitting a configuration instruction to a container ingress/load balancer to delay routing of traffic to a network endpoint until the container sidecar filters the traffic.

14. The method recited in claim 13, wherein the application-layer web application firewall is native to the cloud computing infrastructure, and wherein transitioning the application-layer web application firewall from a deactivated state to an activated state comprises transmitting an activation instruction to activate the application-layer web application firewall.

15. The method recited in claim 14, wherein transitioning the application-layer web application firewall from a deactivated state to an activated state further comprises transmitting a traffic rerouting instruction to reroute traffic to the application-layer web application firewall.

16. The method recited in claim 13, wherein the computing services environment is provided by the service provider, and wherein the application-layer web application firewall is hosted by the service provider, and wherein the application-layer web application firewall is configured to transition to an activated state upon receipt of an instruction from an application-layer controller.

17. The method recited in claim 13, wherein the plurality of mitigation policies are accessed and modified by a version control system or an application procedure interface.

18. The method recited in claim 13, wherein the orchestration engine selects a mitigation policy of the plurality of mitigation policies based on historical data indicating effectiveness of the mitigation policy at mitigating one or more previous distributed denial of service attacks.

19. The method recited in claim 13, wherein the plurality of mitigation policies includes a timeout indicating a point in time at which to revert a mitigation policy of the plurality of mitigation policies to a previous state.

20. One or more non-transitory computer readable media having instructions stored thereon for performing a method implemented at an orchestration engine in a computing services environment providing computing services by a service provider to a plurality of recipients via the Internet, the method comprising:

receiving a plurality of application-layer request messages from a plurality of sources at a plurality of application gateways;

determining a plurality of mitigation policies at an orchestration engine including one or more processors, the plurality of mitigation policies corresponding with the plurality of application gateways based on a classification of a subset of the plurality of application-layer request messages as being sent from a subset of sources associated with a distributed denial of service attack; and transmitting an instruction from the orchestration engine to one or more of a plurality of application-layer web application firewalls corresponding to the plurality of application gateways and being configured to transition from a deactivated state to an activated state upon receipt of the instruction from the orchestration engine, the plurality of application-layer web application firewalls in an activated state implementing the mitigation policies to prevent a subset of subsequent application-layer request messages from the subset of sources from reaching one or more components of the computing services environment, an application-layer web application firewall of the plurality of application-layer web application firewalls being configured as a container sidecar in a virtual container environment and residing in a cloud computing infrastructure hosted by a public cloud provider other than the service provider, wherein transitioning the application-layer web application firewall from a deactivated state to an activated state comprises transmitting a configuration instruction to a container ingress/load balancer to delay routing of traffic to a network endpoint until the container sidecar filters the traffic.

* * * * *